United States Patent
Kalb et al.

(10) Patent No.: US 12,247,741 B2
(45) Date of Patent: Mar. 11, 2025

(54) MULTITUBE PILOT INJECTOR HAVING A SPLIT AIRFLOW FOR A GAS TURBINE ENGINE

(71) Applicant: Power Systems Mfg., LLC, Jupiter, FL (US)

(72) Inventors: Bryan Kalb, Jupiter, FL (US); Matthew Yaquinto, Jupiter, FL (US); Gene Chong, Jupiter, FL (US); David E Paredes, Jupiter, FL (US); James Brackett, Palm Beach, FL (US); Gregory Vogel, Palm Beach Gardens, FL (US); Hany Rizkalla, Stuart, FL (US); Bernard Tam Yen Sam, Jupiter, FL (US); Ramesh Keshava-Bhattu, Jupiter, FL (US); Fred Hernandez, Jupiter, FL (US); Joshua R. Mcnally, Jupiter, FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 0 days.

(21) Appl. No.: 17/980,273

(22) Filed: Nov. 3, 2022

(65) Prior Publication Data
US 2023/0135396 A1 May 4, 2023

Related U.S. Application Data

(60) Provisional application No. 63/275,127, filed on Nov. 3, 2021.

(51) Int. Cl.
F23R 3/00 (2006.01)
F02C 7/22 (2006.01)
(Continued)

(52) U.S. Cl.
CPC .............. *F23R 3/286* (2013.01); *F02C 7/22* (2013.01); *F23R 3/045* (2013.01); *F23R 3/20* (2013.01);
(Continued)

(58) Field of Classification Search
None
See application file for complete search history.

(56) References Cited

U.S. PATENT DOCUMENTS

| 5,235,814 A | 8/1993 | Leonard |
| 2010/0008179 A1 | 1/2010 | Lacy |

(Continued)

FOREIGN PATENT DOCUMENTS

| CN | 104534515 B | 4/2018 |
| EP | 0974789 A1 | 1/2000 |
| JP | 2007232325 A | 9/2007 |

OTHER PUBLICATIONS

International Search Report and Written Opinion of corresponding PCT Application PCT/US2022/048882 dated Sep. 11, 2023, pp. 14.

*Primary Examiner* — Edwin Kang
(74) *Attorney, Agent, or Firm* — Hovey Williams LLP

(57) ABSTRACT

An injector for a combustor of a gas turbine engine is provided with a plurality of air/fuel mixing tubes divided into radially outer and radially inner subsets of air/fuel mixing tubes with a first fuel manifold in fluid communication with the radially outer subset of air/fuel mixing tubes and a second fuel manifold in fluid communication with the radially inner subset of air/fuel mixing tubes. Each of the air/fuel mixing tubes of the radially outer subset of air/fuel mixing tubes includes a substantially quadrilateral cross-sectional profile, and each of the air/fuel mixing tubes of the radially inner subset of air/fuel mixing tubes includes a substantially circular cross-sectional profile.

17 Claims, 20 Drawing Sheets

(51) Int. Cl.
  *F23R 3/04*  (2006.01)
  *F23R 3/20*  (2006.01)
  *F23R 3/28*  (2006.01)
  *F23R 3/34*  (2006.01)
(52) U.S. Cl.
  CPC .............. *F23R 3/343* (2013.01); *F02C 7/222* (2013.01); *F23R 3/346* (2013.01)

(56) References Cited

U.S. PATENT DOCUMENTS

| | | | |
|---|---|---|---|
| 2013/0074510 A1 | 3/2013 | Berry | |
| 2013/0086912 A1* | 4/2013 | Berry | F23R 3/286 239/128 |
| 2013/0232979 A1* | 9/2013 | Singh | F23R 3/286 60/737 |
| 2013/0298561 A1* | 11/2013 | Hughes | F23R 3/286 60/737 |
| 2013/0318977 A1* | 12/2013 | Berry | F23R 3/286 60/739 |
| 2015/0241065 A1* | 8/2015 | Hughes | F23R 3/283 60/737 |
| 2016/0186663 A1* | 6/2016 | Stewart | F23R 3/286 60/737 |
| 2016/0377290 A1* | 12/2016 | Okazaki | F23R 3/10 60/752 |
| 2017/0198914 A1* | 7/2017 | Baumann | F23R 3/343 |
| 2018/0066847 A1* | 3/2018 | Stoia | F23R 3/286 |
| 2020/0141583 A1* | 5/2020 | Berry | F23R 3/346 |

\* cited by examiner

MULTITUBE PILOT INJECTOR HAVING A SPLIT AIRFLOW FOR A GAS TURBINE ENGINE

BACKGROUND

The present disclosure relates generally to gas turbine engines and, more particularly, to injectors used to inject a mixture of compressed air and fuel into a combustor in the gas turbine engines.

Gas turbine engines are used to generate mechanical energy by combusting a fuel/air mixture within a combustor. Fuel and compressed air are delivered to the combustor through one or more fuel injectors. In one type of gas turbine engine disclosed in U.S. Pat. No. 9,752,781, main fuel injectors are located radially outward of a combustion liner in a combustor and are spread in an annular array about the combustion liner. A hemispheric combustor dome assembly is positioned at an inlet end of the combustion liner and reverses the direction of flow of a fuel/air mixture from the main fuel injectors. The hemispheric combustor dome assembly then directs the fuel/air mixture flow into an inlet end of the combustion liner through a series of passageways. A pilot fuel nozzle is positioned along a center axis of the combustion liner is used to ignite, support and maintain one or more stages of the fuel/air mixture from the main fuel injectors within the combustion liner. While the gas turbine engine disclosed in U.S. Pat. No. 9,752,781 is advantageous in that it allows for greater control of the velocity of the fuel/air mixture entering the combustion liner, which can lead to greater control over the power generated and reductions in the production of undesired oxides of nitrogen and carbon monoxide, further improvements in the control of the flue/air mixture would be desirable.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

Aspects of the disclosure relate to a gas turbine engine including a combustor having one or more fuel injectors. More particularly, aspects are directed to a multitube pilot injector that reduces thermal stresses and combustor emissions while improving combustor performance and efficiency.

In one aspect, the disclosure is directed to an injector for a combustor of a gas turbine engine comprising: a plurality of air/fuel mixing tubes including a radially outer subset of air/fuel mixing tubes and a radially inner subset of air/fuel mixing tubes; a first fuel manifold in fluid communication with the radially outer subset of air/fuel mixing tubes; and a second fuel manifold in fluid communication with the radially inner subset of air/fuel mixing tubes. Each of the air/fuel mixing tubes of the radially outer subset of air/fuel mixing tubes includes a substantially quadrilateral cross-sectional profile, and each of the air/fuel mixing tubes of the radially inner subset of air/fuel mixing tubes includes a substantially circular cross-sectional profile.

In another aspect, the disclosure is directed to a combustor for a gas turbine engine and comprising: a generally cylindrical flow sleeve; a generally cylindrical combustion liner positioned radially inward from the flow sleeve and defining a combustion zone; a first injector that is generally annularly shaped and surrounds the combustion liner and is positioned at a downstream end of the flow sleeve, and a second injector that is positioned radially inward of the combustion liner at an inlet end of the combustion zone to receive the compressed air from the radially outward openings in the first injector following the radially outward path. The first injector comprises: radially outward openings to allow passage of compressed air following a radially outward path; and radially inward openings to allow passage of compressed air following a radially inward path. The second injector comprises: a plurality of air/fuel mixing tubes including a radially outer subset of air/fuel mixing tubes and a radially inner subset of air/fuel mixing tubes; a first fuel manifold in fluid communication with the radially outer subset of air/fuel mixing tubes; and a second fuel manifold in fluid communication with the radially inner subset of air/fuel mixing tubes. Each of the air/fuel mixing tubes of the radially outer subset of air/fuel mixing tubes includes a substantially quadrilateral cross-sectional profile, and each of the air/fuel mixing tubes of the radially inner subset of air/fuel mixing tubes includes a substantially circular cross-sectional profile.

BRIEF DESCRIPTION OF THE DRAWINGS

The present technology is described in detail below with reference to the attached drawing figures, in which like numerals represent the same components, and wherein.

DETAILED DESCRIPTION

Figure 1:
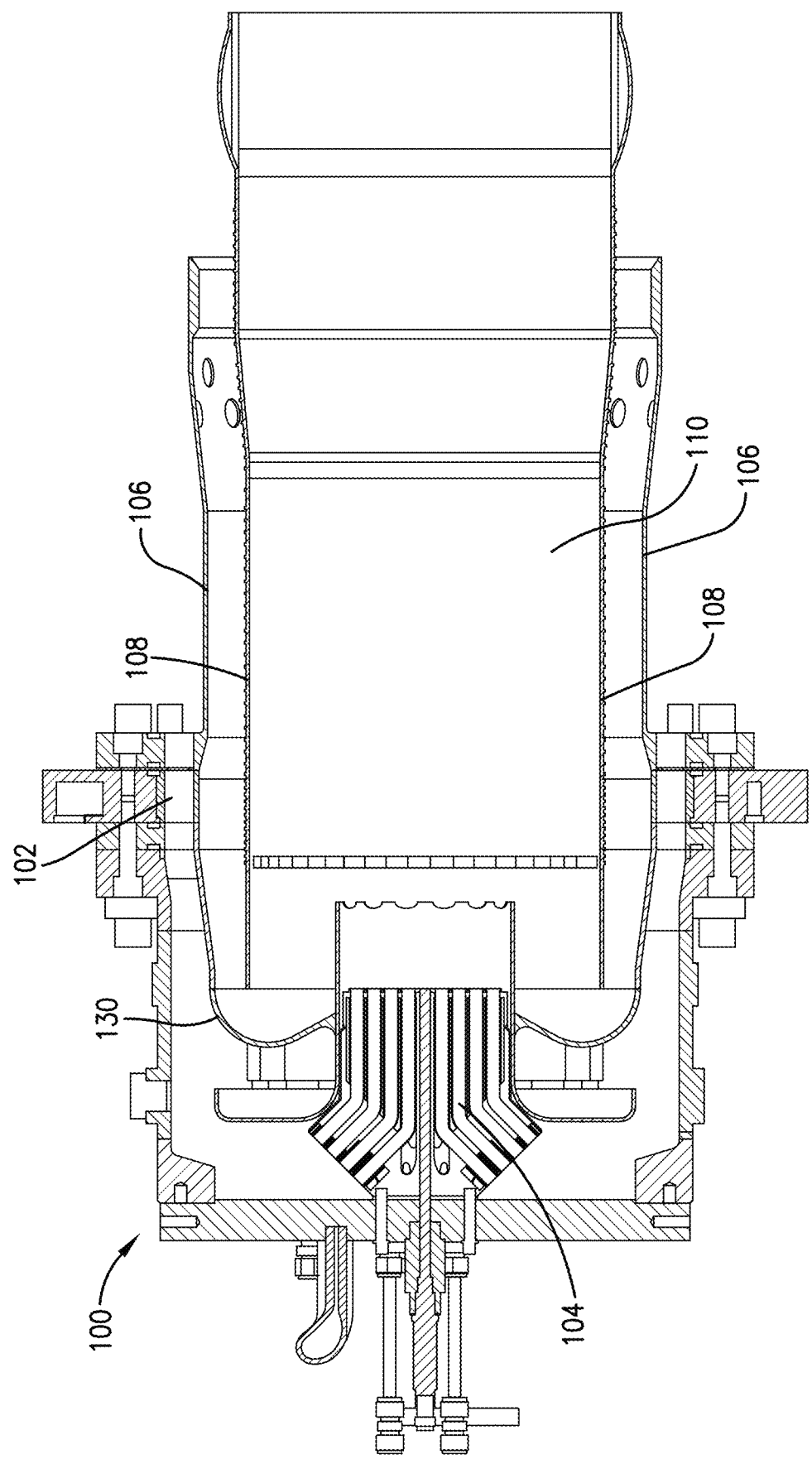
FIGS. 1-2 are cross-sectional views of a gas turbine combustor according to aspects of the disclosure.

Turning now to the drawings in greater detail, and initially to FIG. 1, a combustor of a gas turbine engine according to aspects of the disclosure is designated generally by the numeral 100. The combustor 100 generally includes a first, or radially outward, injector 102, a second, or radially inward, injector 104, a generally cylindrical flow sleeve 106, and a generally cylindrical combustion liner 108 that is positioned radially inward from the flow sleeve 106 and generally defines a combustion zone 110. The first injector 102 is generally annularly shaped and surrounds the combustion liner 108 and is positioned at a downstream end of the flow sleeve 106. The second injector 104 is positioned radially inward of the combustion liner 108 at an inlet end of the combustion zone 110.

Figure 2:
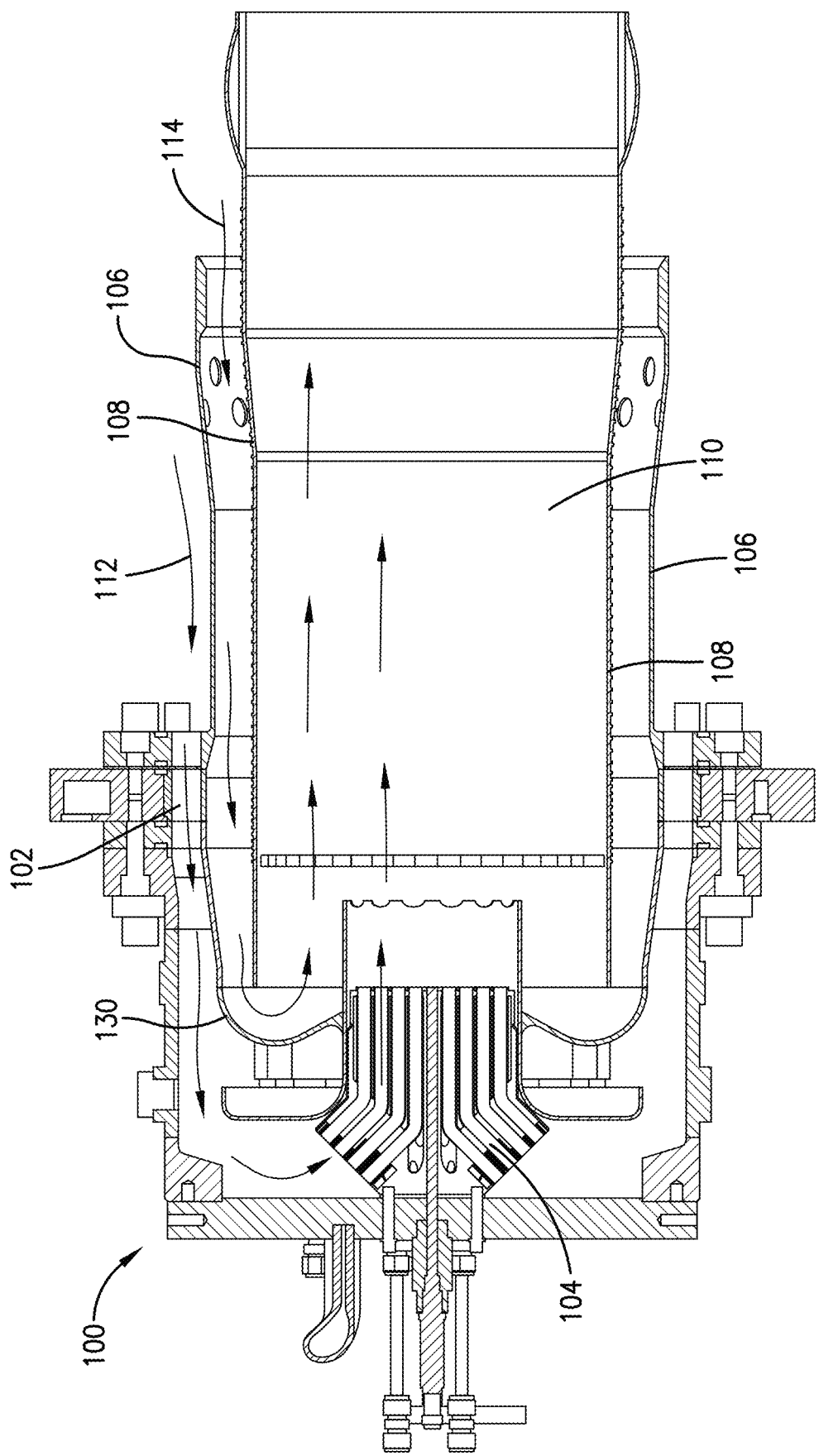

As best understood with reference to FIG. 2, during use of the combustor 100 compressed air is presented to both the first and second injectors 102, 104, where it mixes with a fuel source and then is ignited, supporting a flame within the combustion chamber 110. Compressed air following a radially outer path 112 along a radially outer surface of the flow sleeve 106 passes through radially outward vanes and/or openings provided in the first injector 102 without being mixed with fuel therein, instead continuing downstream to a portion of the combustor 100 where the air turns and passes through the second injector 104. Here, the compressed air mixes with a fuel source and is ignited to support a flame near a central axis of the combustor 100. Compressed air following a radially inner path 114 between the flow sleeve 106 and the combustion liner 108 passes through different (i.e., radially inward) vanes and/or openings provided in the first injector 102, where it is mixed with a fuel source. The fuel/air mixture then travels to the dome plate 130 or a similar structure where it turns substantially 180 degrees, entering the combustion chamber 110 where it is ignited to support a flame radially outward of the flame supported by the second injector 104. In some embodiments, the first injector 102 is referred to as the "main" injector, while the second injector 104 is referred to as the "pilot" and/or "pilot tune" (or simply "p-tune") injector.

Figure 3:
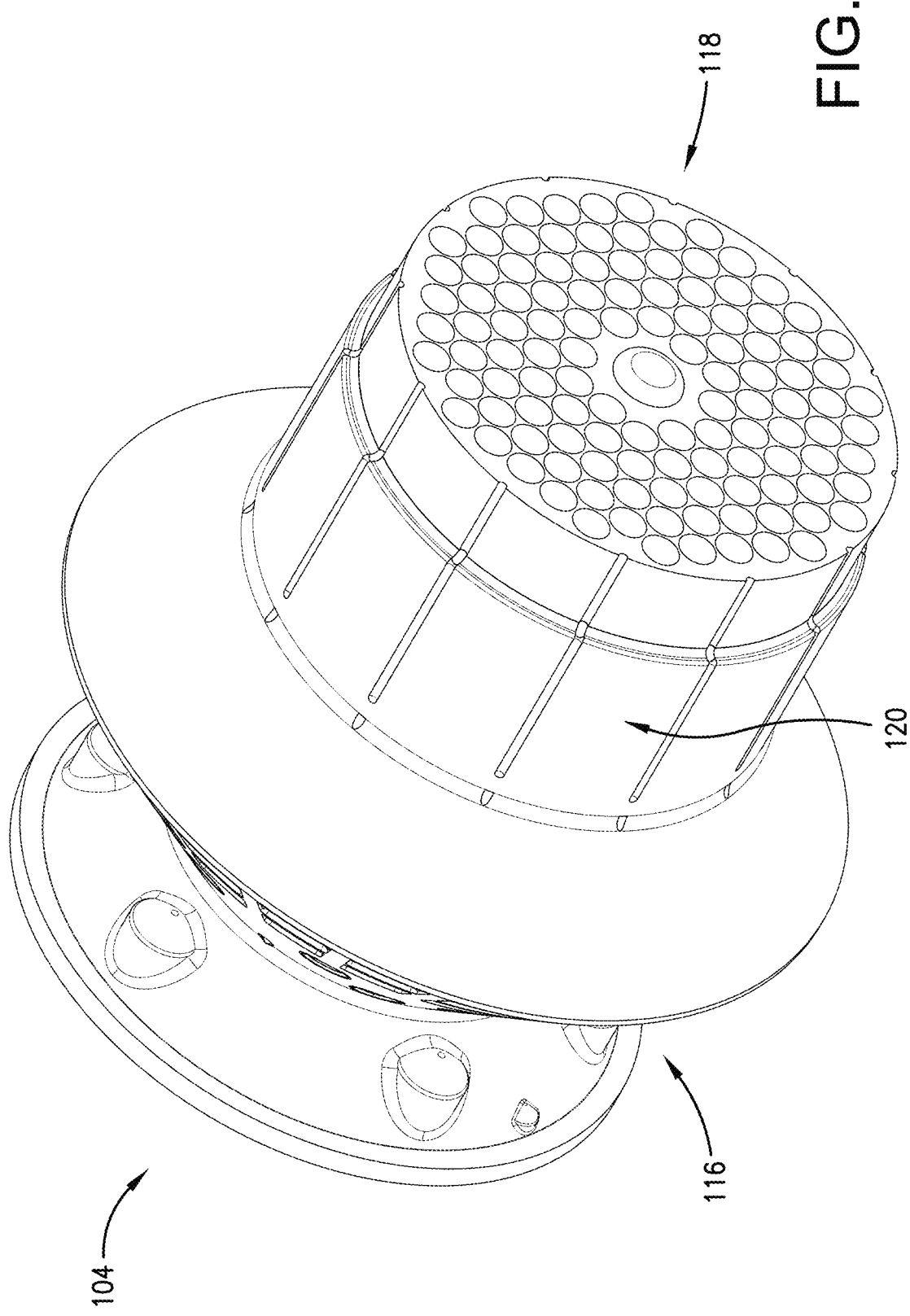
FIG. 3 is a perspective view of a first embodiment of an injector for a gas turbine combustor, such as the combustor shown in FIGS. 1-2, according to aspects of the disclosure.

FIG. 3 shows one embodiment of the second, or pilot, injector 104 used to mix fuel and air passing through the radially outer path 112. The embodiments of the second injector discussed herein, including second injector 104 and others, may beneficially reduce emissions, particularly carbon monoxide emissions, during a startup regime of the combustor 100 and thus, more broadly, reduce emissions within a gas turbine engine in which the combustor 100 is employed. The injectors are also beneficially configured to be supplied with a variety of types of fuel including natural gas, hydrogen gas, and others. Put another way, the second injectors discussed herein improve flame stabilization and reduce startup emissions among a wide array of firing temperatures, including relatively low firing temperatures.

The second injector 104 generally includes an inlet portion 116 configured to receive compressed air flowing in the radially outer path 112, an outlet portion 118 configured to supply a fuel/air mixture to the combustion zone 110 where it is ignited and supports a flame near the central axis of the combustor 100, and an air/fuel mixing portion 120 generally extending between the inlet portion 116 and the outlet portion 118.

Figure 4:
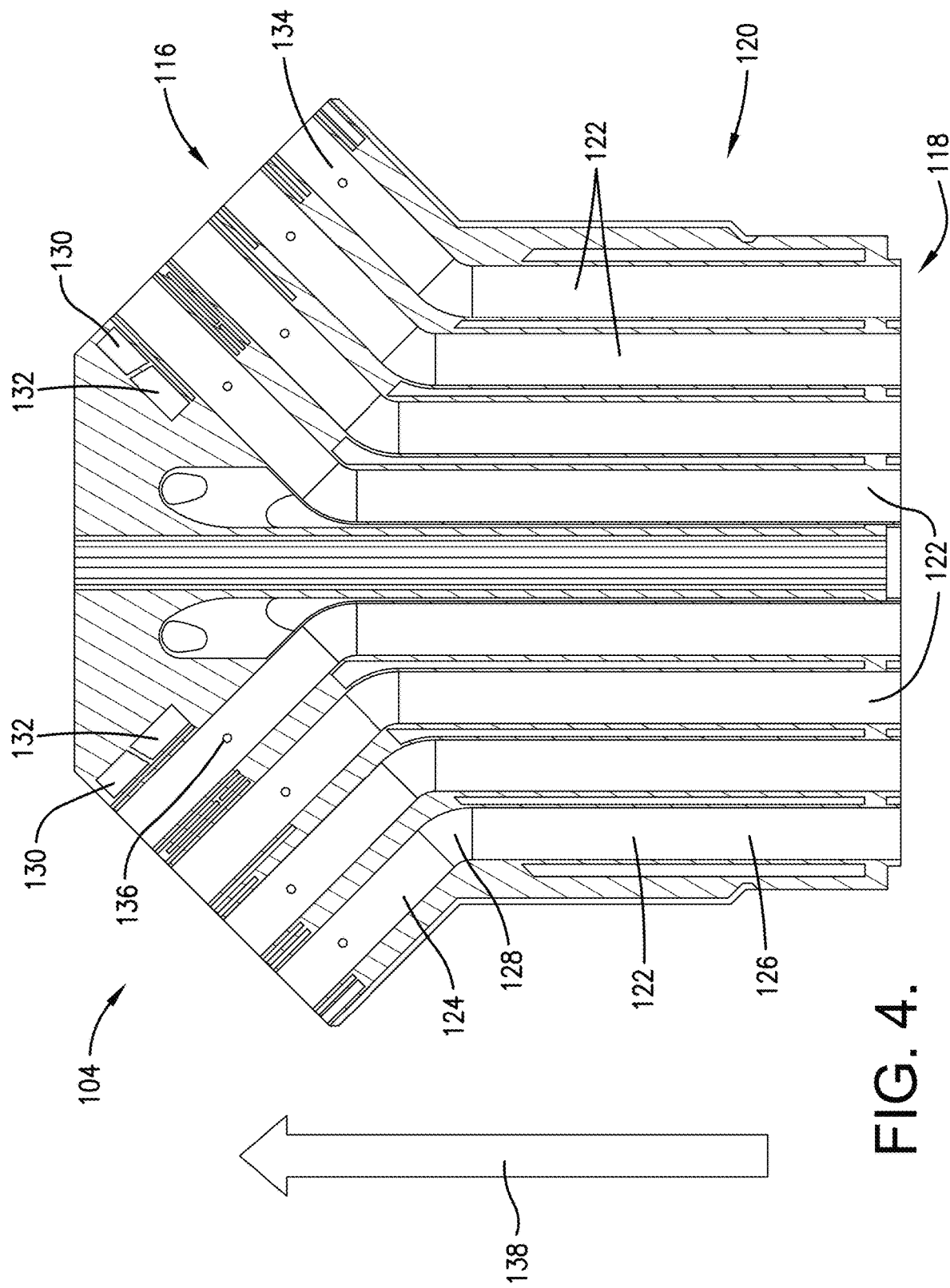
FIG. 4 is a cross-sectional plan view of the injector shown in FIG. 3.

As best seen in FIG. 4, which is a partial cross-sectional view of the second injector 104, the air/fuel mixing portion 120 includes a plurality of air/fuel mixing tubes 122 extending from the inlet portion 116 to the outlet portion 118. Each air/fuel mixing tube 122 includes an upstream portion 124, a downstream portion 126, and an elbow portion 128 fluidly connecting the upstream portion 124 to the downstream portion 126. In some embodiments, the upstream portion 124 is disposed at an oblique angle with respect to the downstream portion 126 such as, e.g., a 45-degree angle. By maintaining the elbows 128 at an approximate 45-degree angle or similar angle, the second injector 104 may be additively manufactured without the need for external supports. Moreover, the elbow 128 (e.g., the 45-degree bend) improves mixing of the fuel and air in the air/fuel mixing tubes 122 as the mixture travels therein, turns, and becomes turbulent.

The second injector 104 also includes a first fuel manifold 130 and a second fuel manifold 132, each in fluid communication with one or more of the plurality of air/fuel mixing tubes 122 via a corresponding one or more fuel feed tubes 134 and 136. For example, in the depicted embodiment the first fuel manifold 130 is in fluid communication with a radially outwardly located subset of the plurality of air/fuel mixing tubes 122 (i.e., the "outer diameter" or "OD" subset of the air/fuel mixing tubes 122) via the fuel feed tube(s) 134, while the second fuel manifold 132 is in fluid communication with a radially inwardly located subset of the plurality of air/fuel mixing tubes 122 (i.e., the "inner diameter" or "ID" subset of the air/fuel mixing tubes 122) via the fuel feed tube(s) 136. In this regard, the combustor 100 can be staged by selectively injecting fuel into the OD or ID subset of the air/fuel mixing tubes 122 via the first and second fuel manifolds 130, 132, respectively, which in turn will be ignited in the combustion chamber 110 forming two separately supported and localized flames (i.e., an annular outer flame surrounding a centrally located inner flame).

The second injector 104 may be manufactured by any desired means such as, in one non-limiting example, by additive manufacturing. In this regard, the second injector 104 would be built up layer by layer in the substantially vertical direction as it appears in FIG. 4. This is schematically illustrated by build arrow 138. Each layer will include gaps of material that in turn form the internal, hollow passages of the second injector 104 such as the plurality of air/fuel mixing tubes 122, first and second fuel manifolds 130, 132, fuel feed tubes 134, 136, and other features discussed herein. Again, because the upstream portion 124 and the downstream portion 126 of the air/fuel mixing tubes 122 are arranged at an approximately 45-degree angle relative to one another, the injector 104 can be additively manufactured without the need for external supports, etc.

Figure 5:
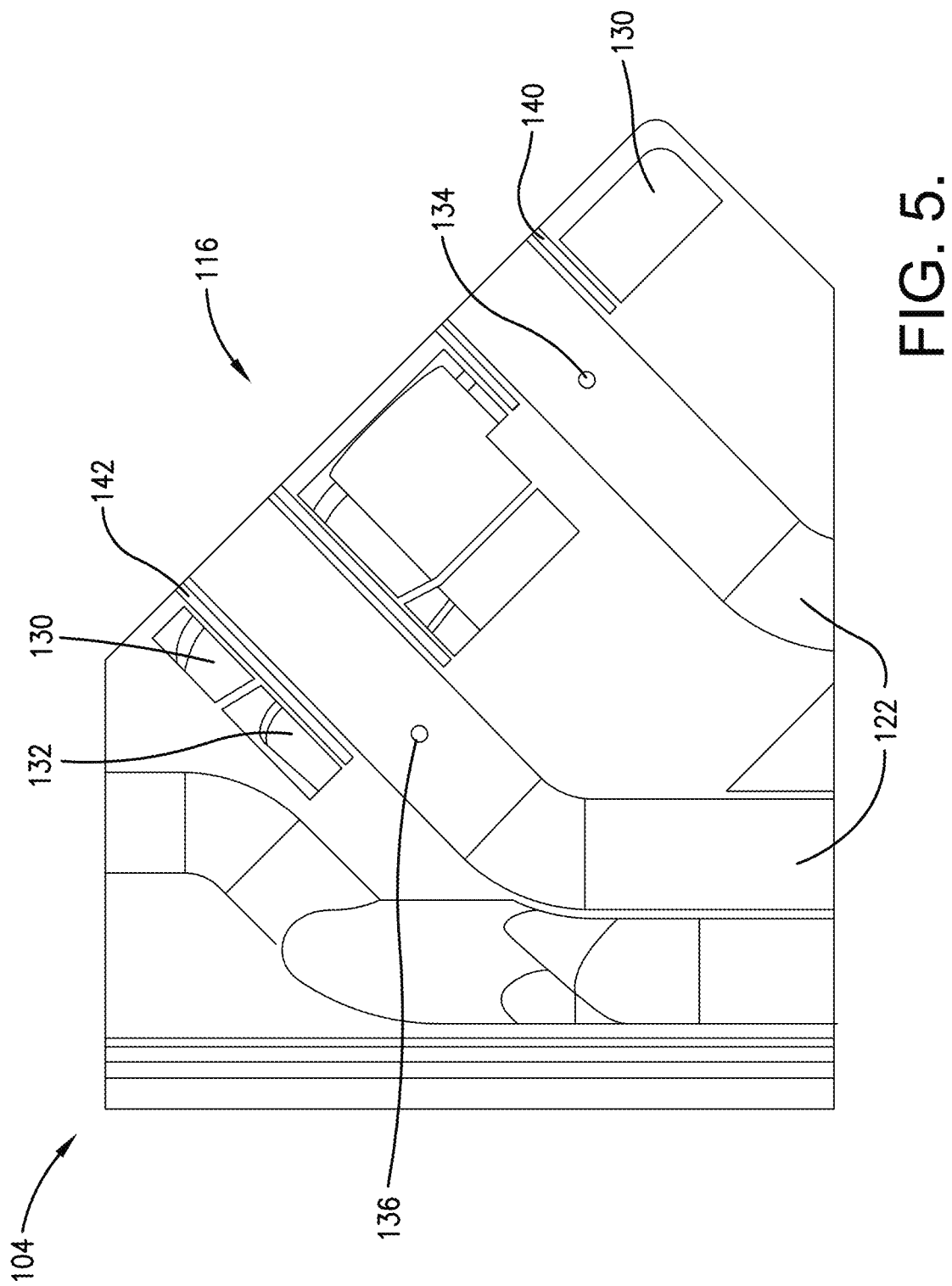
FIG. 5 is a close-up view of a portion of the cross-sectional view of the injector shown in FIG. 4.
Figure 6:
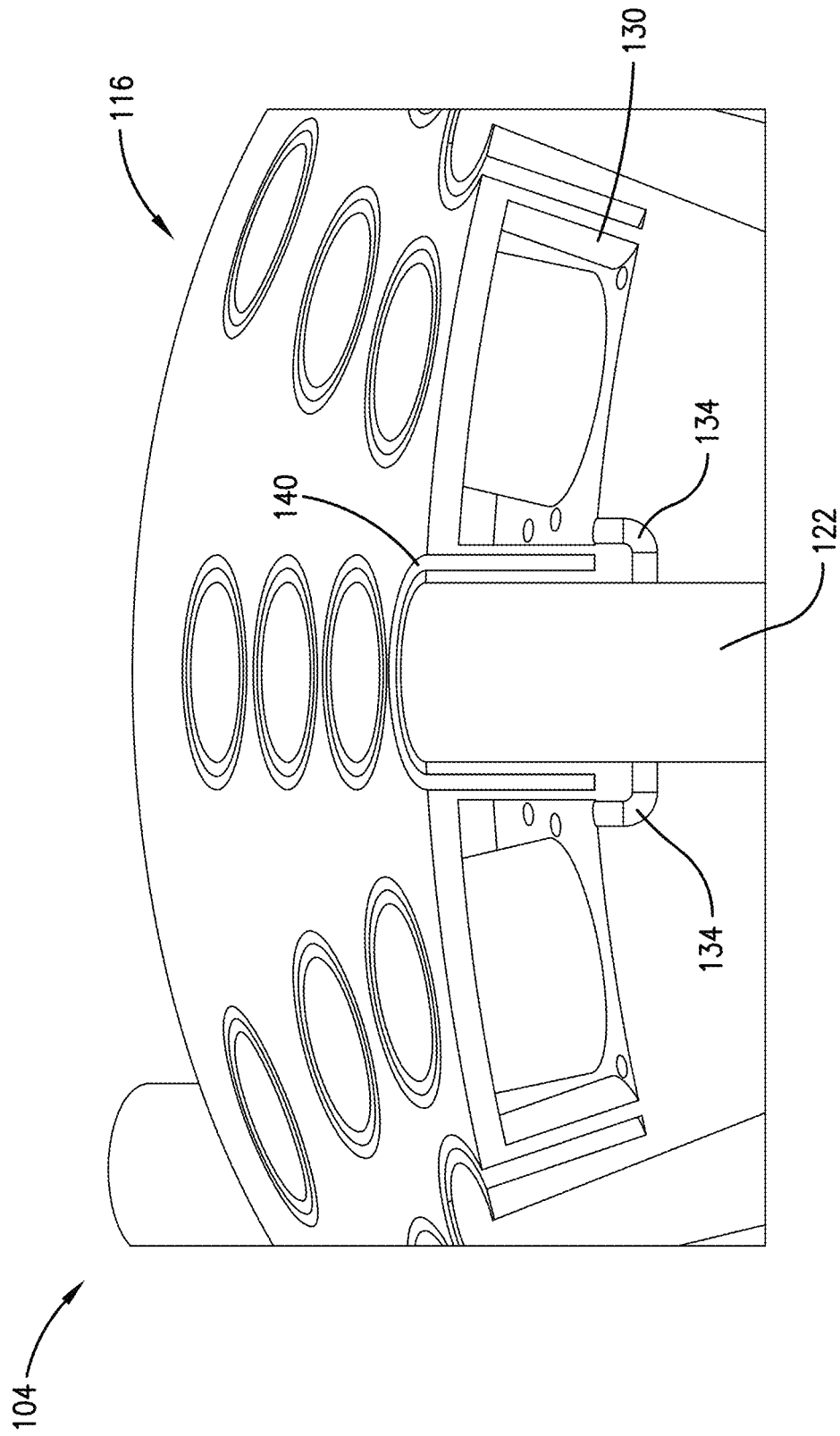
FIG. 6 is a close-up view of a perspective and cross-sectional view of the injector shown in FIGS. 3-5.

FIGS. 5 and 6 show up-close, sectional views of upstream portions 124 of the air/fuel mixing tubes 122 of the second injector 104 near the inlet portion 116. In this embodiment, each of the plurality of air/fuel mixing tubes 122 is thermally isolated from the corresponding first or second fuel manifold 130, 132 via an intermediate air manifold or plenum. Namely, the first subset of the plurality of air/fuel mixing tubes 122 that are in fluid communication with the first fuel manifold 130 are separated from the first fuel manifold 130 by a surrounding first static air plenum 140, while the subset of the plurality of air/fuel mixing tubes 122 that are in fluid communication with the second fuel manifold 132 are separated from the second manifold 130 and the second fuel manifold 132 by a surrounding second static air plenum 142.

As best shown in FIG. 6, the fuel feed tubes 134, 136 are each in turn generally L-shaped so that the fuel in each first and second fuel manifold 130, 132 is configured to travel from a downstream end of the respective first or second fuel manifold 130, 132 before turning at a substantially 90-degree angle to meet the respective air/fuel mixing tube 122, where it is introduced to the compressed air flowing therethrough and thus mixed with the compressed air, forming the air/fuel mixture to ultimately be ignited in the combustion chamber 110. Put another way, a distal portion of the fuel feed tubes 134, 136 may be oriented approximately normal to the air/fuel mixing tubes 122 such that the fuel is injected cross-stream into the flowing compressed air, which optimizes fuel and air mixing within the air/fuel mixing tubes 122. Although only one of the air/fuel mixing tubes 122 forming part of the subset of the plurality of air/fuel mixing tubes 122 that is in fluid communication with the first fuel manifold 130 is shown in detail in FIG. 6 for convenience, the structure and operation of the air/fuel mixing tubes 122 in fluid communication with the second fuel manifold 132 would be substantially similar. Put another way, each air/fuel mixing tube 122 is completely isolated from the respective first or second fuel manifold 130, 132 via the intermediate first or second static air plenum 140, 142 without any fuel feed tubes 134, 136 (or any other components for that matter) extending through the first and second static air plenum 140, 142.

Among other benefits, the first and second static air plenums 140, 142 may beneficially serve as a buffer between the hot compressed air flowing through the air/fuel mixing tubes 122 and the cool fuel provided in the first and second fuel manifolds 130, 132. That is, the first and second static air plenums 140, 142 insulate the air/fuel mixing tubes 122 from the cold fuel, thereby improving the strength and stress resistance of the tubes near the cold first and second fuel manifolds 130, 132.

Figure 7:
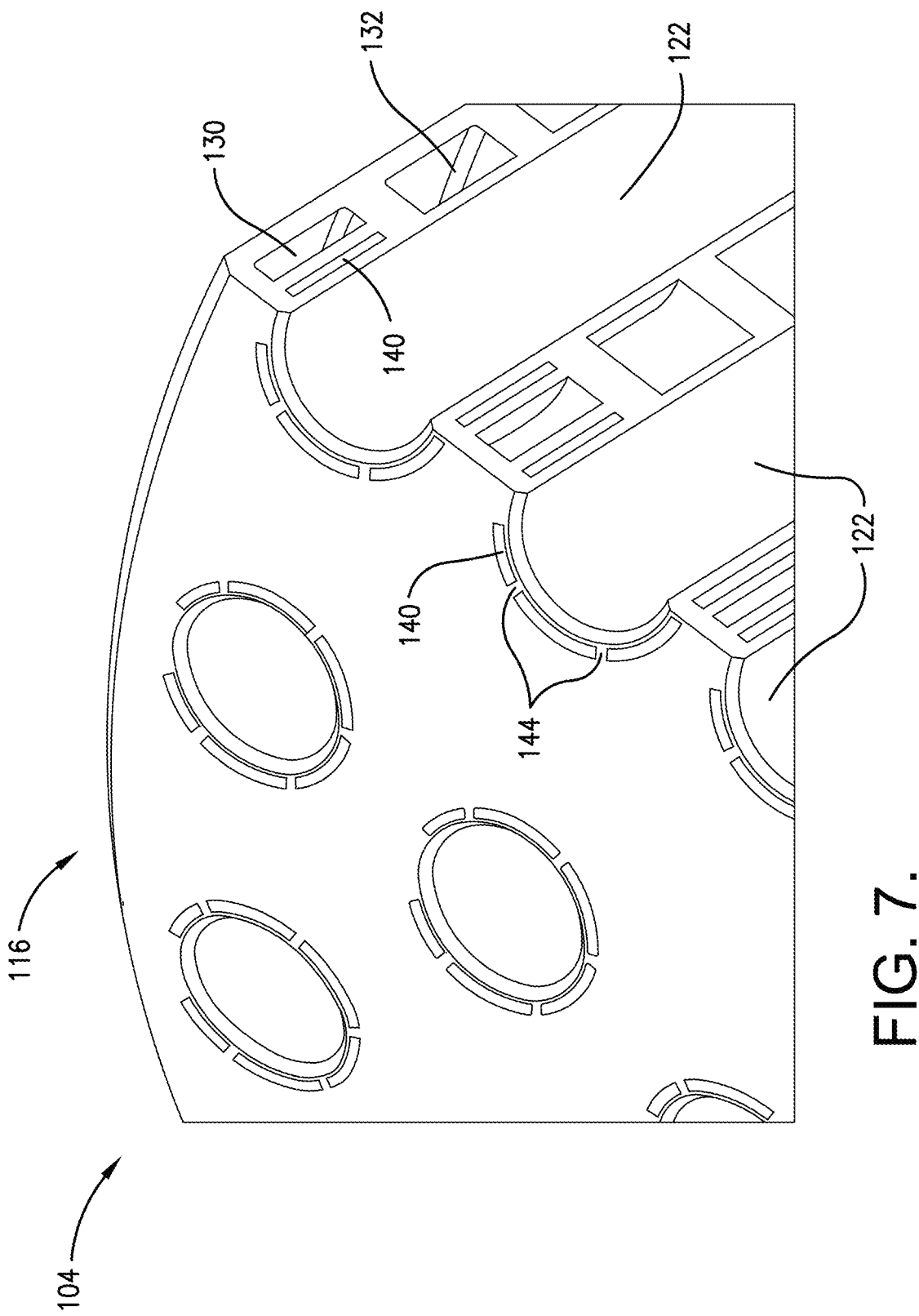
FIG. 7 is an alternative close-up view of a perspective and cross-sectional view of the injector shown in FIGS. 3-5.

In the embodiment shown in FIG. 6, the inlets to the first and second static air plenums 140, 142 are annular; that is, the annular cross-section of the first and second static air plenums 140, 142 extends completely to the inlet surface of the injector 104. However, in other embodiments the inlets to the first and second static air plenums 140, 142 need not be annular or unbroken. For example, as shown in FIG. 7, in some embodiments the inlets will include a broken or dashed configuration. That is, the annular cross-section of the first and second static air plenums 140, 142 are interrupted by a series of ribs 144 at the inlet thereof that connect the surrounded air/fuel mixing tubes 122 with a body of the second injector 104 that surrounds the first and second static air plenums 140, 142. The ribs 144 may add rigidity and structural integrity at the inlet surface without significantly reducing the cross-sectional area of the inlet to the first and second static air plenums 140, 142, thereby allowing air to enter and exit the first and second static air plenums 140, 142.

Figure 8:
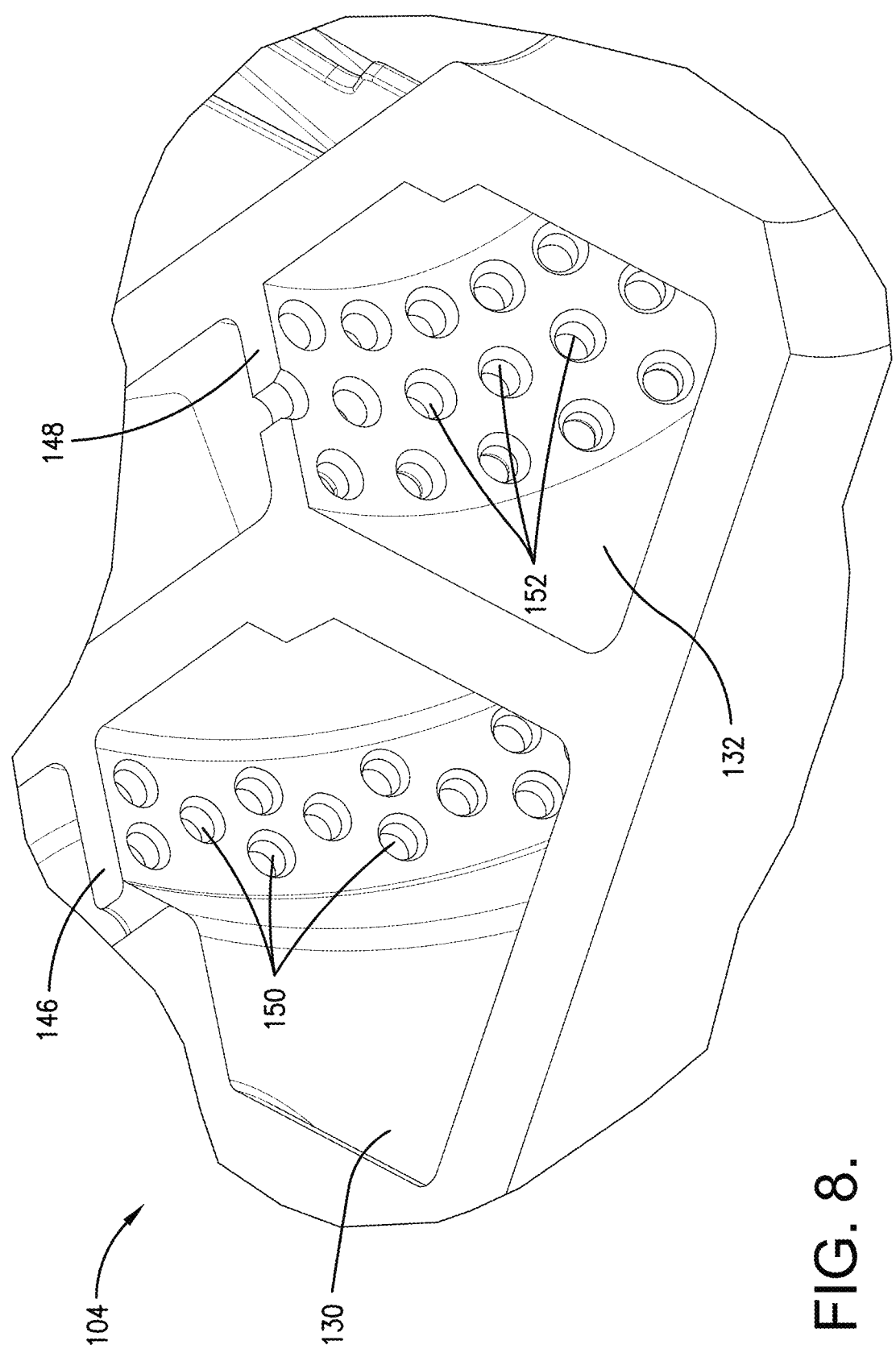
FIGS. 8 and 9 are close-up views of a perspective and cross-sectional view of the injector shown in FIGS. 3-7.
Figure 9:
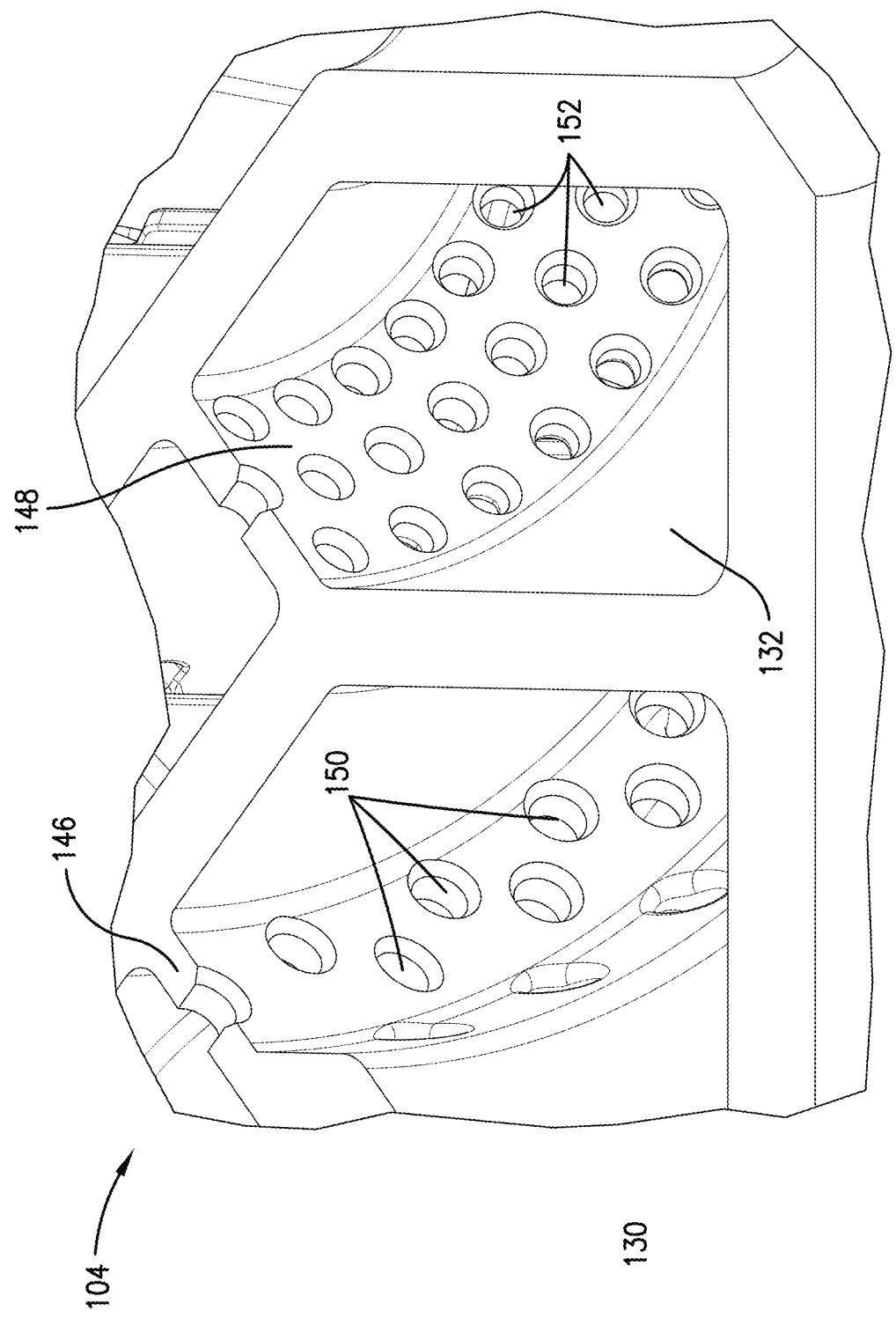

As shown in FIGS. 8 and 9, in some embodiments the first and second fuel manifolds 130, 132 may include one or more internal baffle plates 146, 148. The baffle plates 146, 148, in turn include a plurality of through-holes 150, 152 provided therein providing fluid communication from a first portion of the respective first or second fuel manifold 130, 132 to a second portion of the respective first or second fuel manifold 130, 132 by allowing fluid to flow through the baffle plates 146, 148. The baffle plates 146, 148 may increase rigidity and strength of the injector 104 and, more particularly, the inlet portion 116 thereof without significantly interfering with fuel flow within the first and second fuel manifolds 130, 132 and to the respective air/fuel mixing tubes 122. Additionally, the baffle plates may beneficially serve to evenly distribute fuel from the first and second fuel manifolds 130, 132 to each of the air/fuel mixing tubes 122. In one non-limiting example, each first and second fuel manifold 130, 132 includes a respective baffle plate 146, 148, with each baffle plate having three circumferential rows 36 of through-holes 150, 152, each of the through-holes having a diameter of approximately 0.100 inches.

In some embodiments, the plurality of air/fuel mixing tubes used to mix and deliver fuel and air may be structured and configured differently than that shown in FIGS. 4-9 in order to, e.g., improve mixing of the fuel and air therein. For example, in some embodiments the plurality of air/fuel mixture and delivery tubes may be twisted or swirled in order to improve the mixture of fuel and air therein. This may be more readily understood with reference to FIG. 10.

Figure 10:
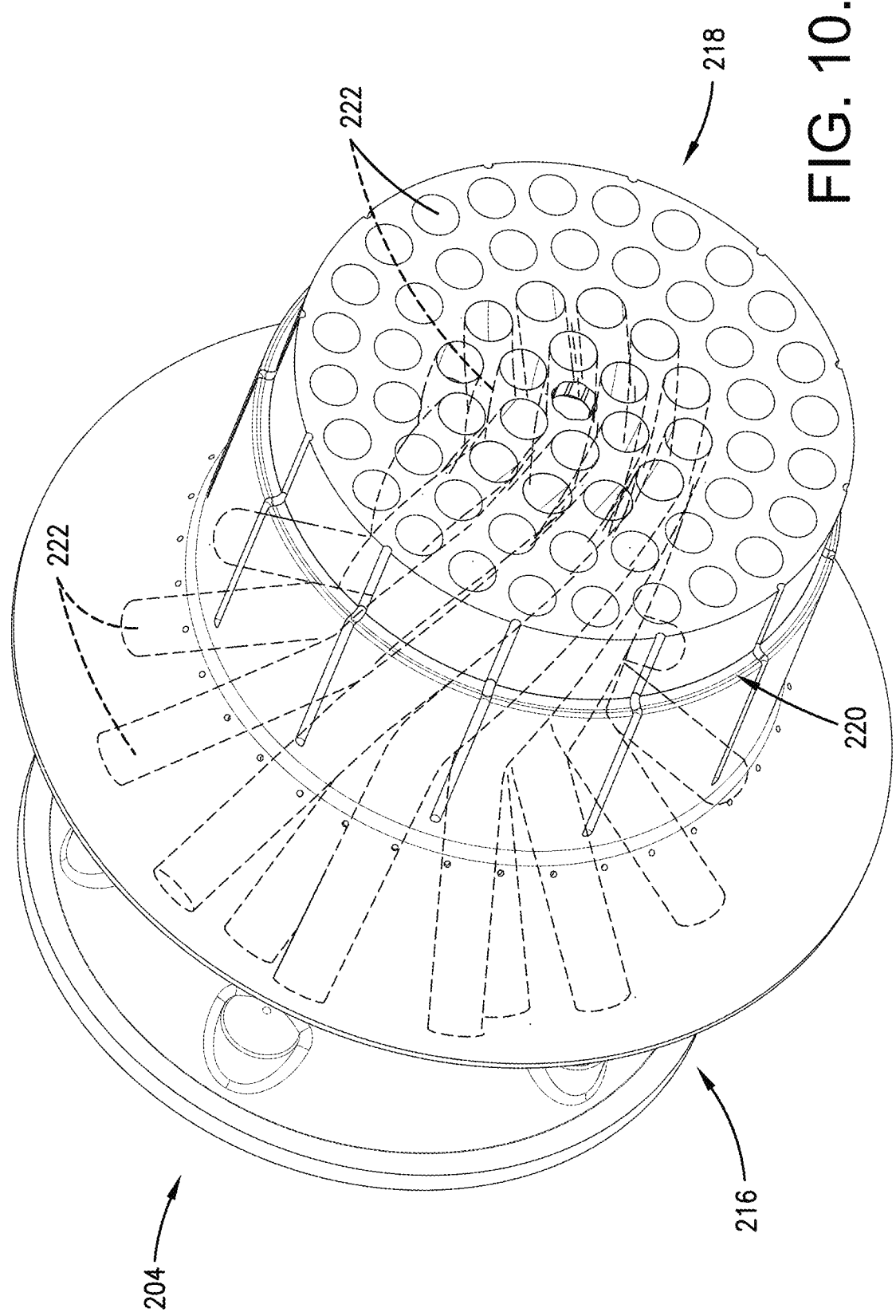
FIG. 10 is a perspective view of a second embodiment of an injector for a gas turbine combustor, such as the combustor shown in FIGS. 1-2, according to aspects of the disclosure.

More particularly, FIG. 10 shows another embodiment of a second (e.g., pilot) injector 204, with some of the internal air/fuel mixing tubes 222 therein shown in phantom to illustrate the specific configuration thereof. In the embodiments described herein, unless described otherwise, components with like-numbered trailing numerals operate in a substantially similar manner as the components discussed in connection with the first embodiment of the second injector 104, and thus for simplicity will not be discussed again in detail. For example, the inlet portion 216 of this embodiment is configured and operates in a substantially similar manner to the inlet portion 116 of the second injector 104, and thus will not be discussed again in detail.

In the FIG. 10 embodiment, at least a subset of the air/fuel mixing tubes 222, which are shown in phantom in FIG. 10 as a radially inner (ID) subset, are twisted or swirled, creating a substantially helical path for the air/fuel mixture to follow. This in turn may lead to a more homogenous air/fuel fixture resulting in more efficient burning and reduced emissions. Although such a swirled configuration would be difficult to accomplish with traditional manufacturing techniques, these complex geometries can readily be implemented when the injector 204 is formed from additive manufacturing, as discussed above.

Figure 11:
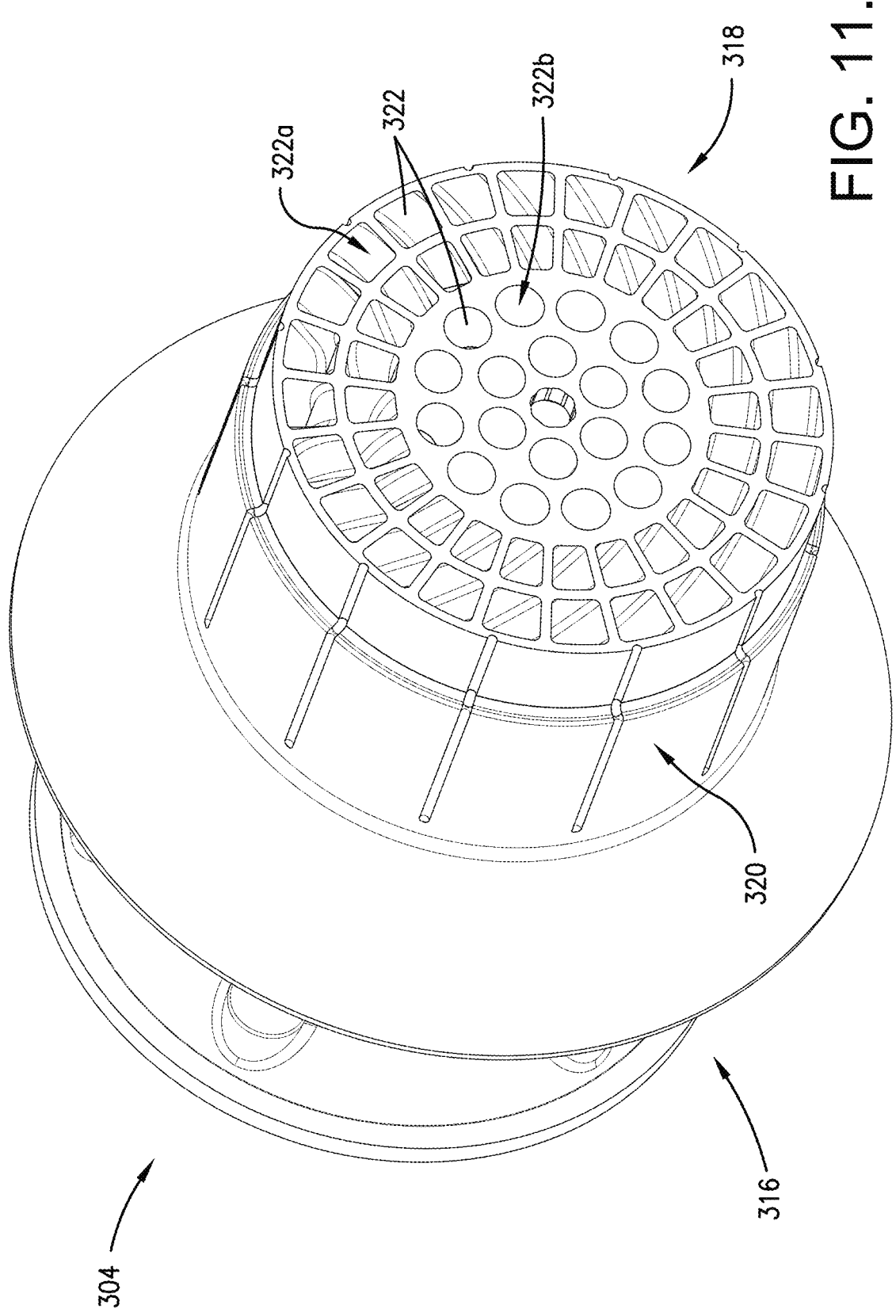
FIG. 11 is a perspective view of a third embodiment of an injector for a gas turbine combustor, such as the combustor shown in FIGS. 1-2, according to aspects of the disclosure.
Figure 12:
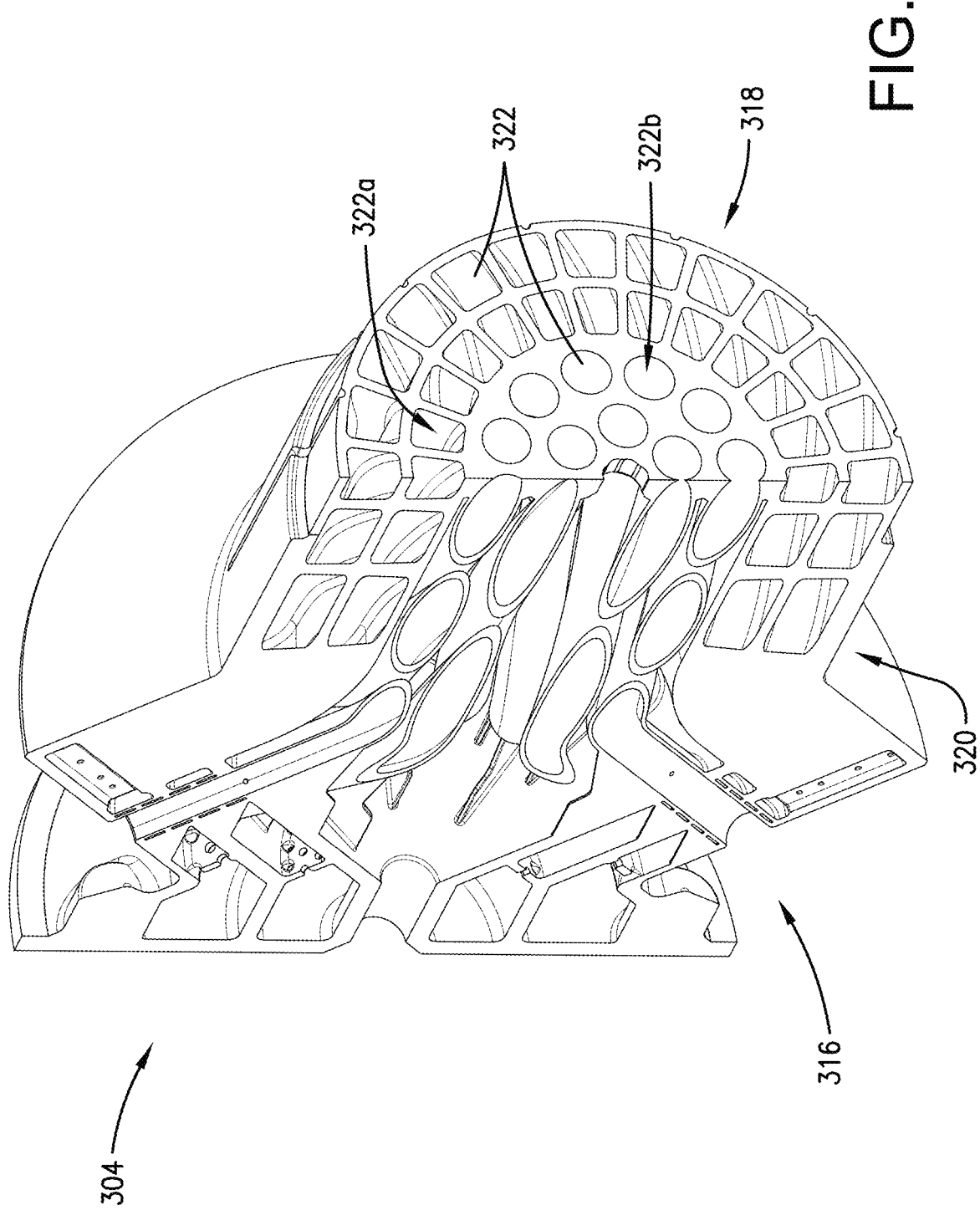
FIG. 12 is a perspective, cross-sectional view of the injector shown in FIG. 11.
Figure 13:
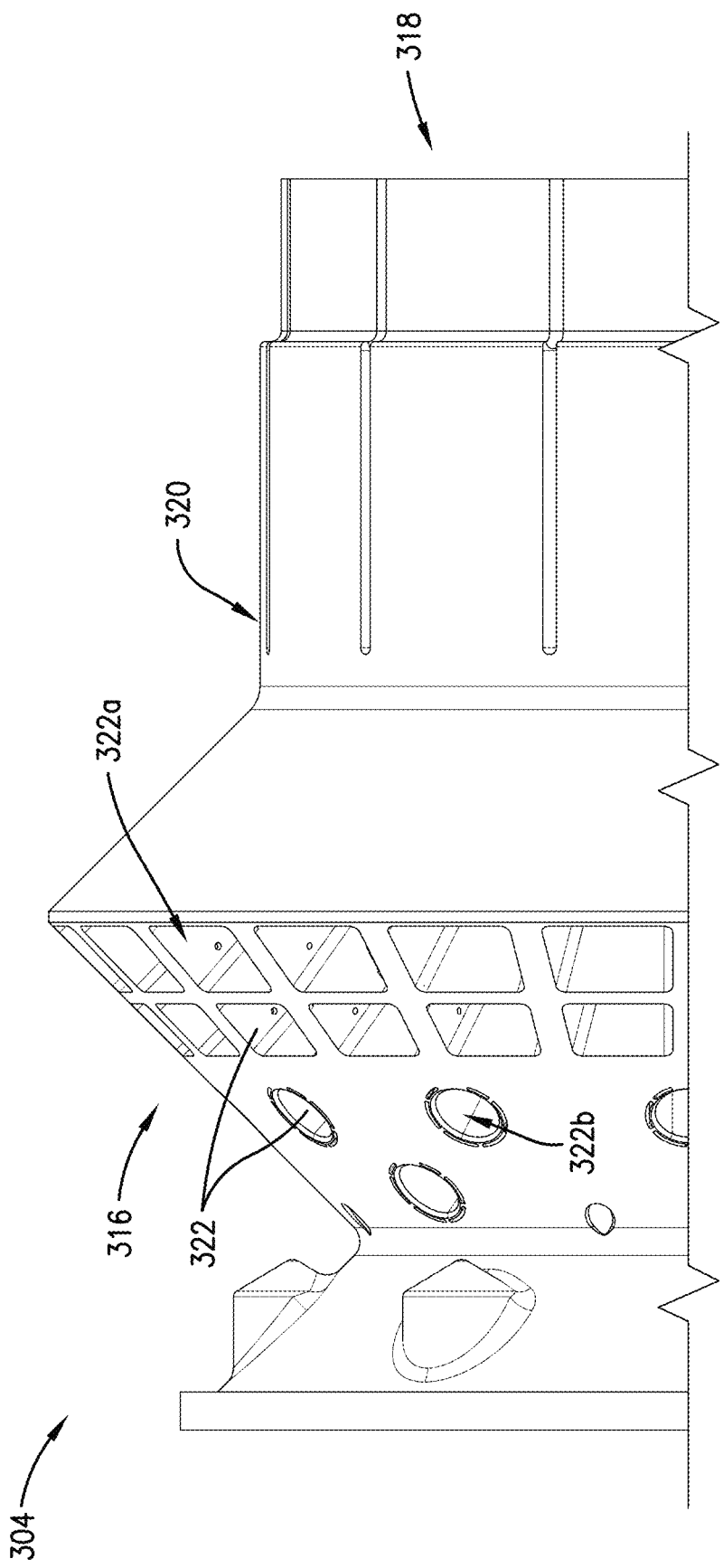
FIG. 13 is a partial side view of the injector shown in FIGS. 11-12.

Although the embodiments described thus far have included air/fuel mixing tubes 122, 222 having a substantially circular cross-sectional area, embodiments are not so limited and in other embodiments the air-fuel mixture tubes may have other cross-sectional area configurations without departing from the scope of the disclosure. For example, FIGS. 11-13 show an embodiment of a second injector 304 in which a first subset 322a of the plurality of air/fuel mixing tubes 322 includes a substantially quadrilateral cross-sectional profile, while a second subset 322b of the plurality of air/fuel mixing tubes 322 are twisted or swirled and each includes a substantially circular cross-sectional profile. In this embodiment, the quadrilateral profile of the first subset of air/fuel mixing tubes 322a, which is shown as an outer diameter (OD) subset, allows a greater flowrate of the air/fuel mixture to flow through the air/fuel mixing tubes 322 as compared to the second subset of air/fuel mixing tubes 322b, which is shown as an radially inner (ID) subset, having a circular cross-sectional profile. Additionally, or alternatively, the inlets to each air/fuel mixing tube 322 could similarly be any desired shape including quadrilateral, such as the first subset 322a of air/fuel mixing tubes shown in FIG. 13. Again, this increases the amount of compressed airflow within the mixing tubes 322 as compared to mixing tubes including a circular cross-sectional area.

In some embodiments, one or more flow modifiers may be included along the length of the air/fuel mixture mixing tubes 122, such as in the upstream portion 124 prior to the 45-degree bend, in order to, e.g., create turbulence and improve air and fuel mixing within the respective tube. This may be more readily understood with respect to FIG. 14A, which shows one embodiment of a flow modifier 354 being implemented in the second injector 304 (and more particularly the first subset 322a of air/fuel mixing tubes 322 of the second injector 304), however, similar modifiers could be implemented in any of the injectors contemplated herein.

In this embodiment the flow modifier 354 includes a substantially saw-tooth type pattern, with a main wedge portion 356 and a serrated end portion 358. As compressed air passes over the wedge portion 356, it speeds up and is directed toward a central portion of the respective air/fuel mixing tube 322a. As it travels over the serrated end portion 356, the sawtooth pattern results in the airflow creating trapped vortices near the serrated end portion 358, as illustrated by the airflow diagram 360 in FIG. 14B. These trapped vortices promote air and fuel mixing. Put another way, the flow modifier 354 creates a wake upstream of the fuel injection points, thereby improving air and fuel mixing at the fuel injection point.

Figure 14A:
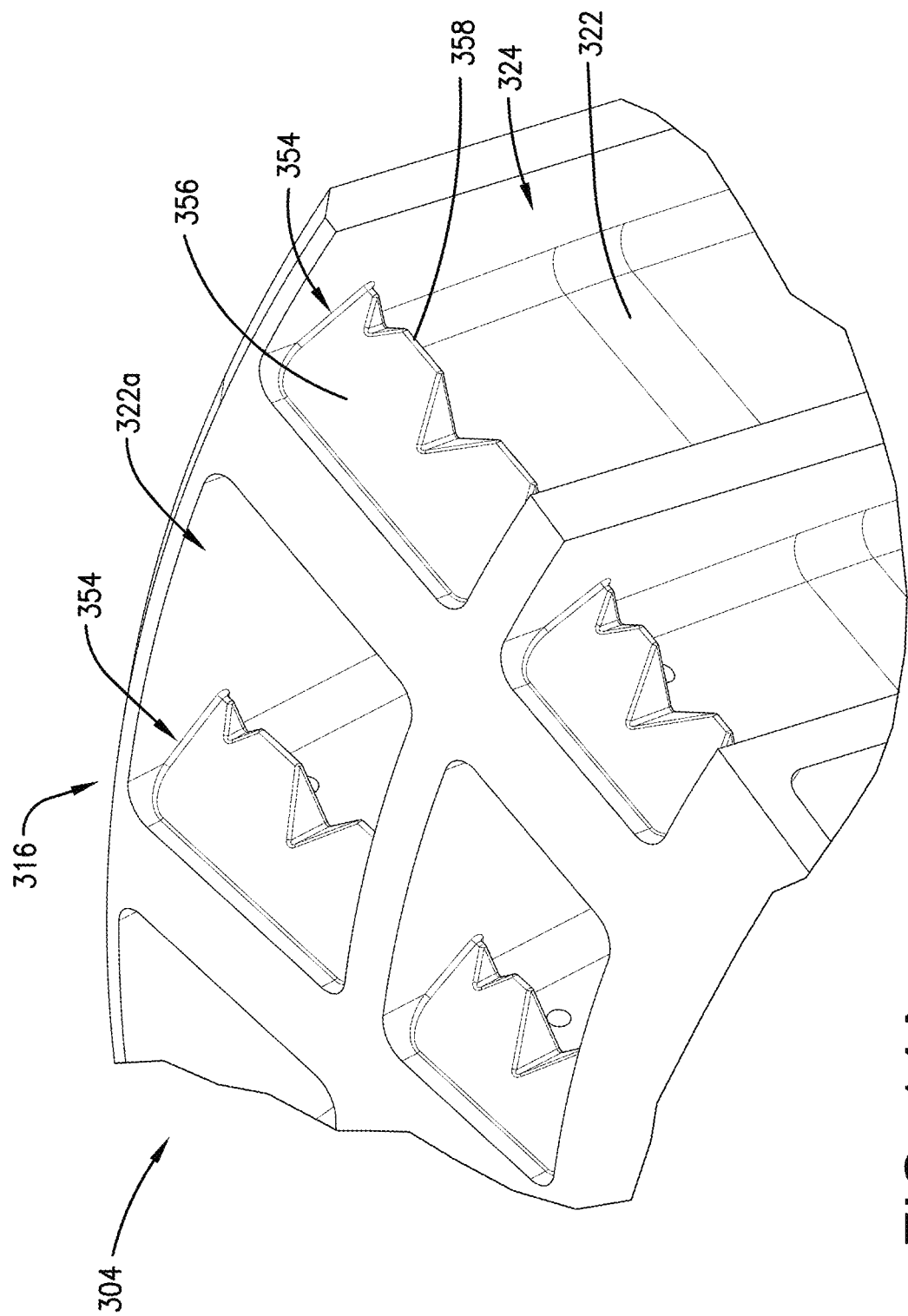
FIG. 14A is a close-up view of a perspective and cross-sectional view of a modified upstream portion of the injector shown in FIGS. 11-13.
Figure 14B:
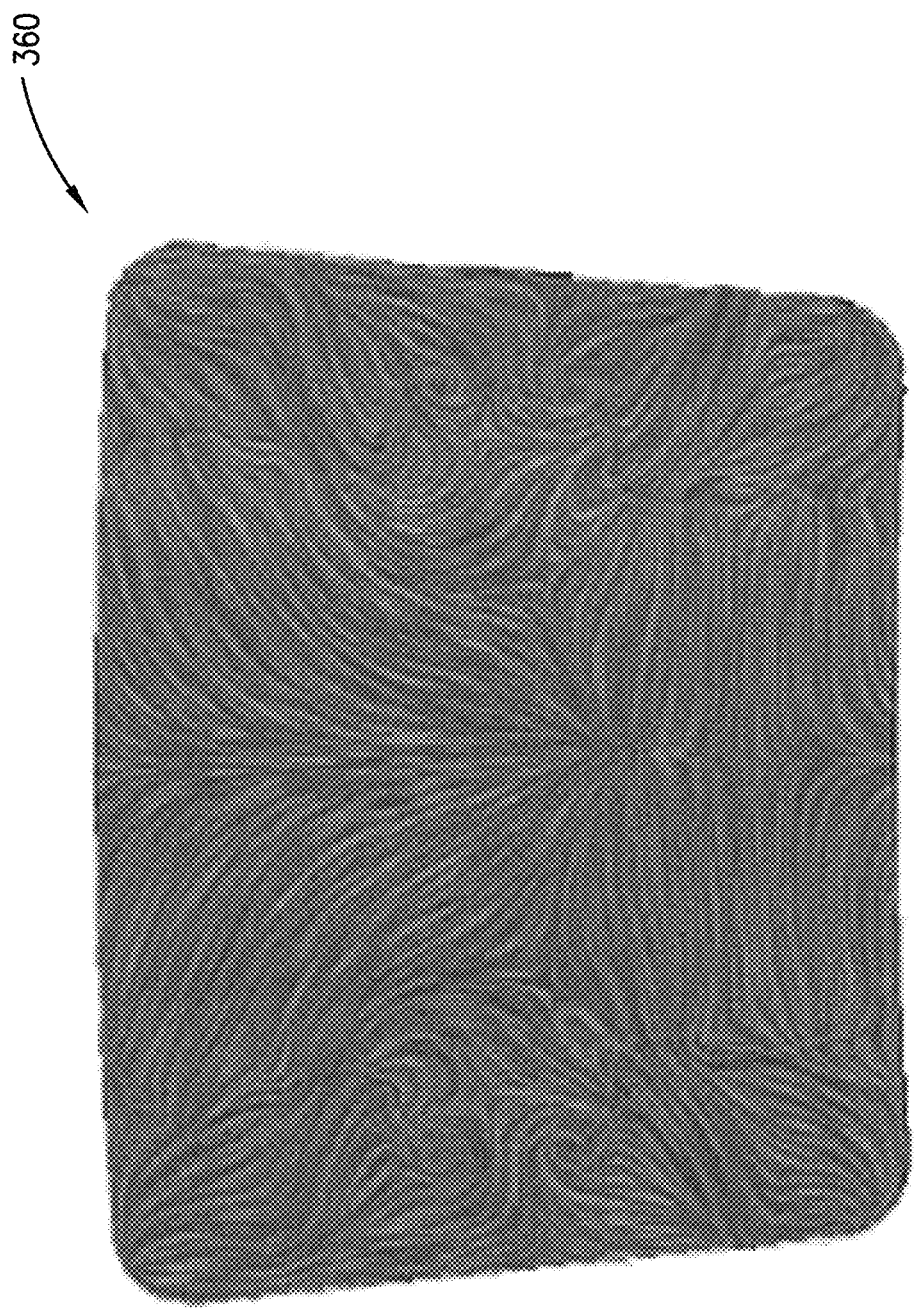
FIG. 14B is an airflow diagram show in the effect of a flow modifier shown in air/fuel mixing tubes of FIG. 14A.

Although the sawtooth pattern is illustrated in FIG. 14A, in other embodiments the modifier could be alternatively structured and configured such as, e.g., by including a wavy or sinusoidal shaped distal end. Moreover, although the depicted embodiment is shown with two flow modifiers 358 per air/fuel mixing tube 322a, in other embodiments more or fewer flow modifiers 358 could be implemented without departing from the scope of the invention including, e.g., one flow modifier 358 per air/fuel mixing tube 322a or three or more flow modifiers 358 per tube air/fuel mixing 322a.

Figure 15:
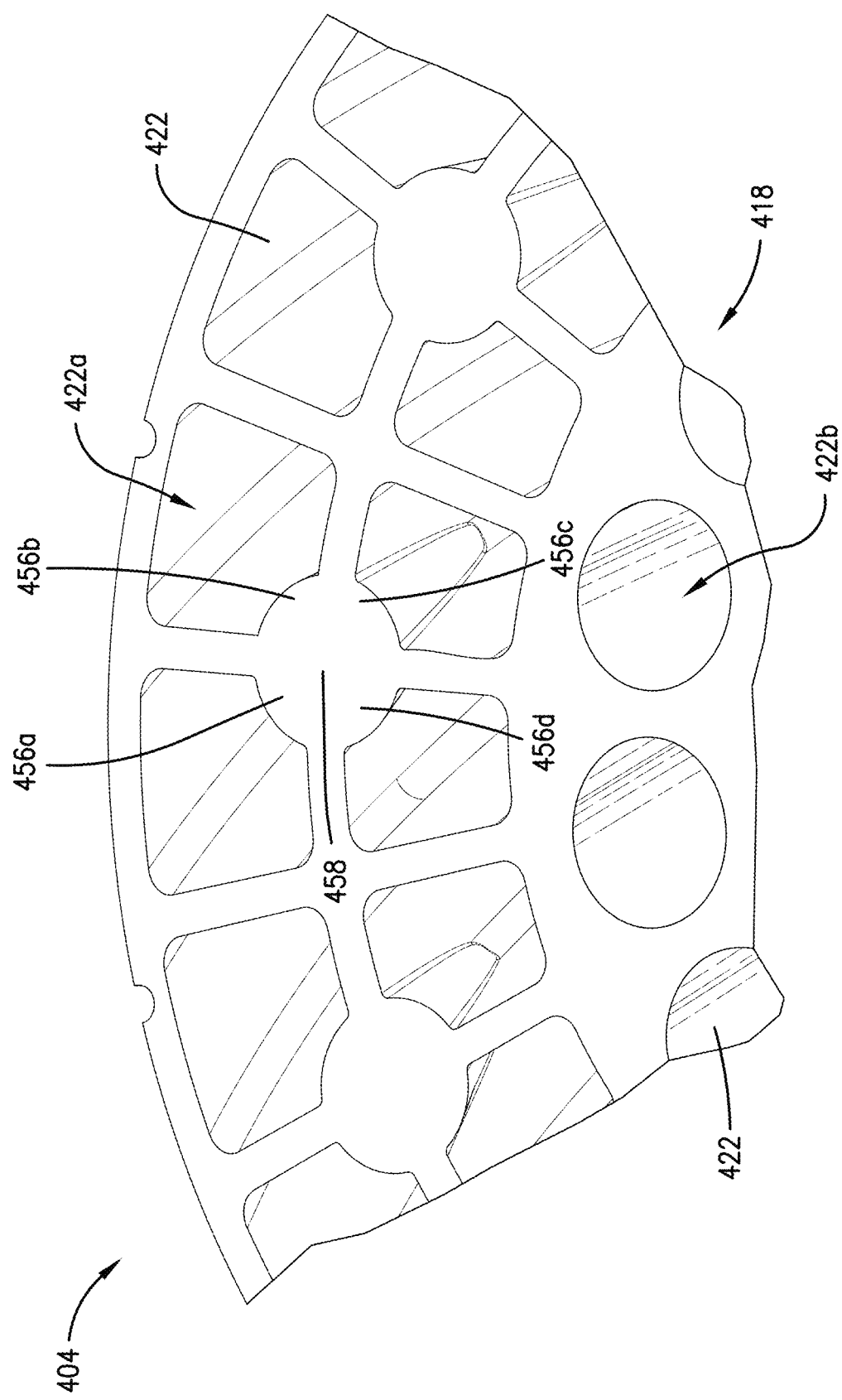
FIG. 15 is a close-up view of a perspective view of a fourth embodiment of an injector for a gas turbine combustor, such as the combustor shown in FIGS. 1-2, according to aspects of the disclosure.

In some embodiments, particularly embodiments in which the second injector includes air/fuel mixing tubes having substantially quadrilateral cross-sectional areas, an exit profile of the air/fuel mixing tube may be modified to include one or more surfaces to encourage flame anchoring at the exit face of the injector. This will be more readily understood with reference to FIG. 15. In FIG. 15, the radially outer (OD) subset 422a of the air/fuel mixing tubes 422 have a substantially quadrilateral cross-sectional area along most of the length of the air/fuel mixing tube 422, however, at the outlet portion 418, each air/fuel mixing tube 422a includes a blocker or arcuate portion 456a-d at one of the four corners thereof. Neighboring ones of the blockers or arcuate portions 456a-d are disposed proximate one another to create a substantially circular flame anchoring surface 458. That is, when the fuel/air mixture exiting the OD tubes 422a is ignited, the resulting flame may stay anchored near the outlet portion 418, and, more particularly, at or on the flame anchoring surfaces 458, because of the recirculation zone created by the blockers 456a, 456b, 456c, 456d and flame anchoring surfaces 458. Any other shape blocker could be implemented (i.e., substantially triangular, half-moon shaped blockers, rectangular blockers, etc.) without departing from the disclosure, so long as the blocker provides a flame anchoring surface and/or increased webbing at the outlet portion 418 of the injector 404 to create recirculation zones and thus encourage flame anchoring. Moreover, more than one blocker could be implemented on some of the air/fuel mixing tubes 422a without departing from the scope of the disclosure.

Figure 16:
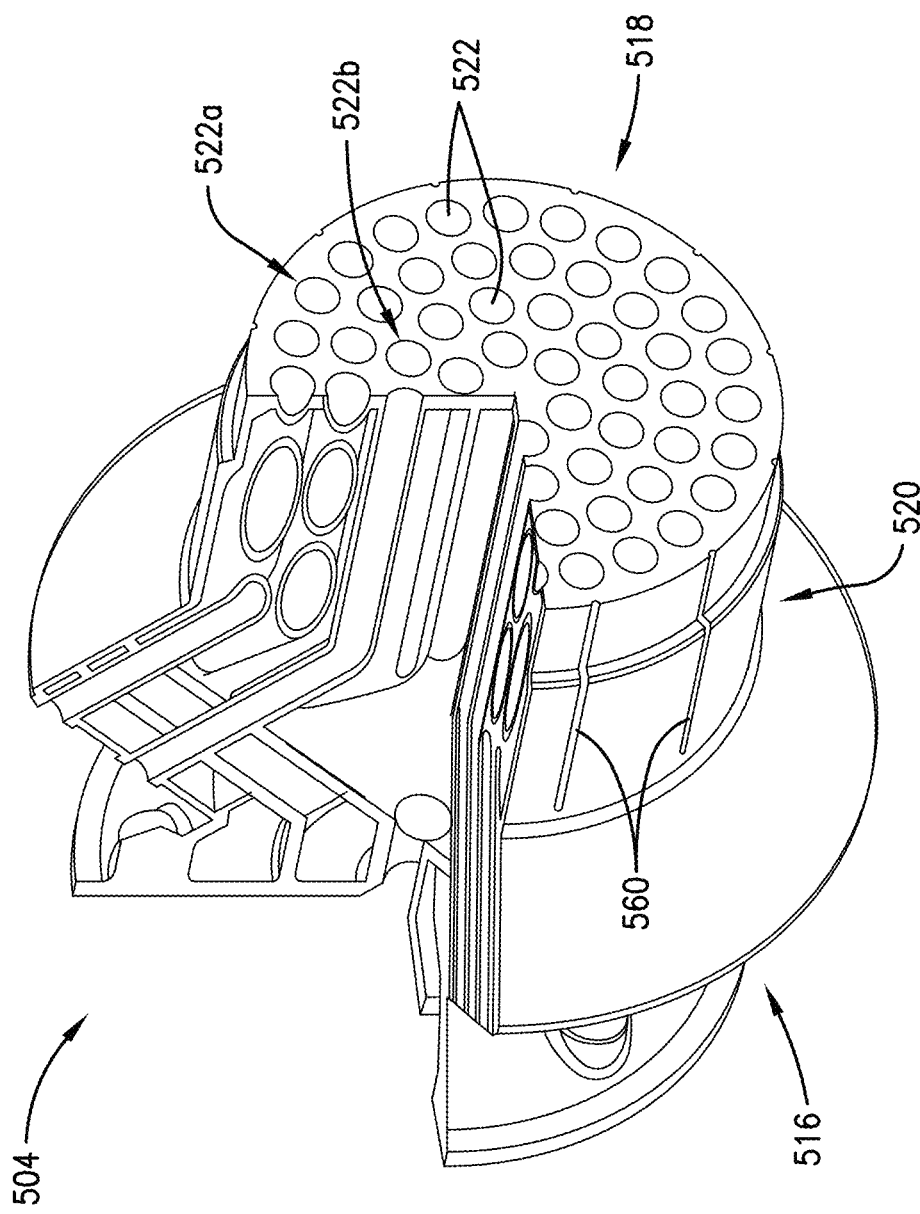
FIG. 16 shows a perspective view of a fifth embodiment of an injector for a gas turbine combustor, such as the combustor shown in FIGS. 1-2, according to aspects of the disclosure.

FIG. 16 shows an alternative design of a second injector 504 that is contemplated according to aspects of the disclosure. In the alternative design, each of the air/fuel mixing tubes 522 in a radially outer (OD) subset 522a of the air/fuel mixing tubes 522 is twisted or swirled, creating a substantially helical path for the air/fuel mixture to follow, and each of the air/fuel mixing tubes 522 in a radially inner (ID) subset 522b of the air/fuel mixing tubes 522 lacks the twist or swirl. This in turn may lead to a more homogenous air/fuel fixture resulting in more efficient burning and reduced emissions. Although such a swirled configuration would be difficult to accomplish with traditional manufacturing techniques, these complex geometries can readily be implemented when the injector 504 is formed from additive manufacturing, as discussed above. The injector 504 may include a radial array of outer channels 560 used to channel air along the outwardly facing surface of the injector 504, thereby cooling the hot outer face of the injector 504, particularly portions located below a hula seal or similar seal that may otherwise become very hot during use of the injector 504.

FIG. 17A-D show schematic representations of a second injector 804, which may be any of the second injectors described above, in which the fuel manifold assemblies have their fuel circuits stacked in different ways to provide different ways to stage the second injectors and thereby vary the burner flame characteristics for improved emissions, dynamics and/or performance. In FIGS. 17A-D, a plurality of air/fuel mixing tubes 822 in the second injector 602 are divided into a radially outer (OD) subset 822a, a radially inner (ID) subset 822b, and a radially intermediate subset 822c of the plurality of air/fuel mixing tubes 822.

Figure 17B:
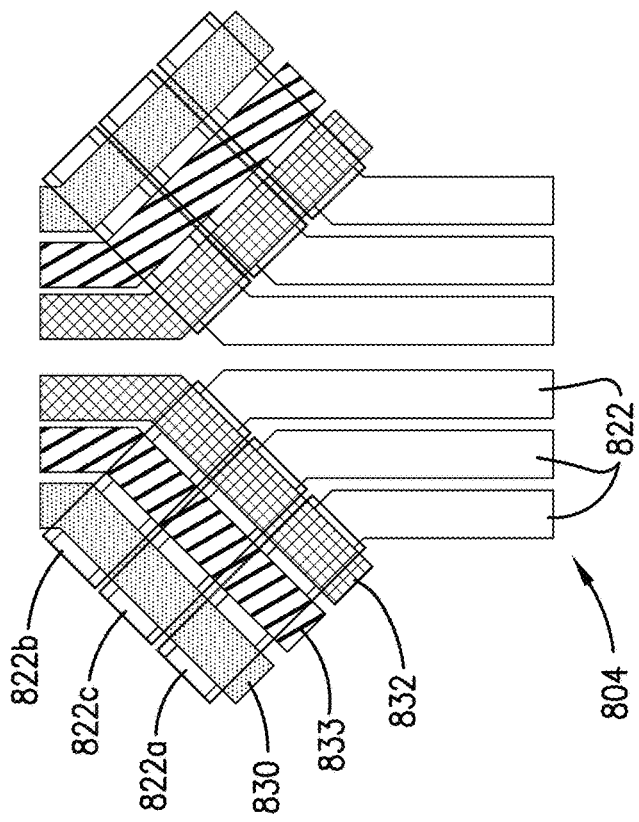
FIGS. 17A-D show schematic plan views of additional embodiments of fuel manifold assemblies that can be used with injectors of the disclosure, such as the injectors shown in FIGS. 1-16.
Figure 17A:
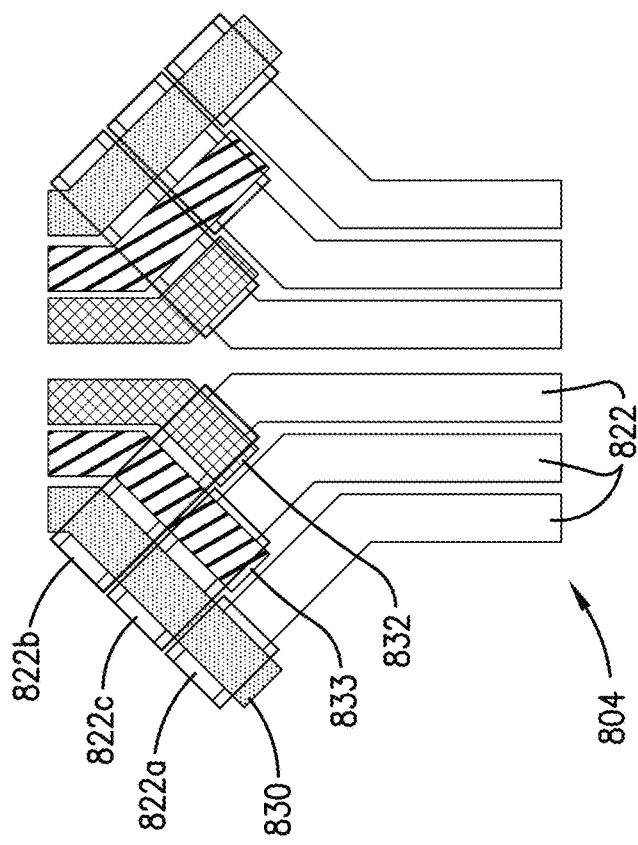

In FIG. 17A, a first fuel manifold 830 is in fluid communication with all three subsets 822a-c of the air/fuel mixing tubes 822, a second fuel manifold 832 is in fluid communication with only the radially inner subset 822b of air/fuel mixing tubes 822, and a third fuel manifold 833 is in fluid communication with only the radially inner and the radially intermediate subsets 822b-c of the air/fuel mixing tubes 822.

In FIG. 17B, each of the first, second and third fuel manifolds 830, 832, 833 is in fluid communication with each of the radially inner, radially outer, and radially intermediate subsets 822a-c of air/fuel mixing tubes 822.

Figure 17D:
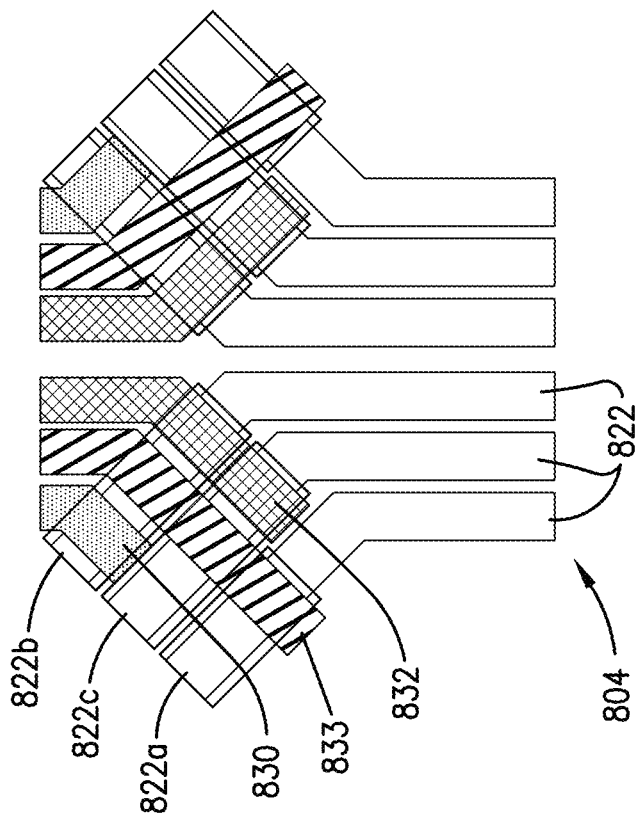
Figure 17C:
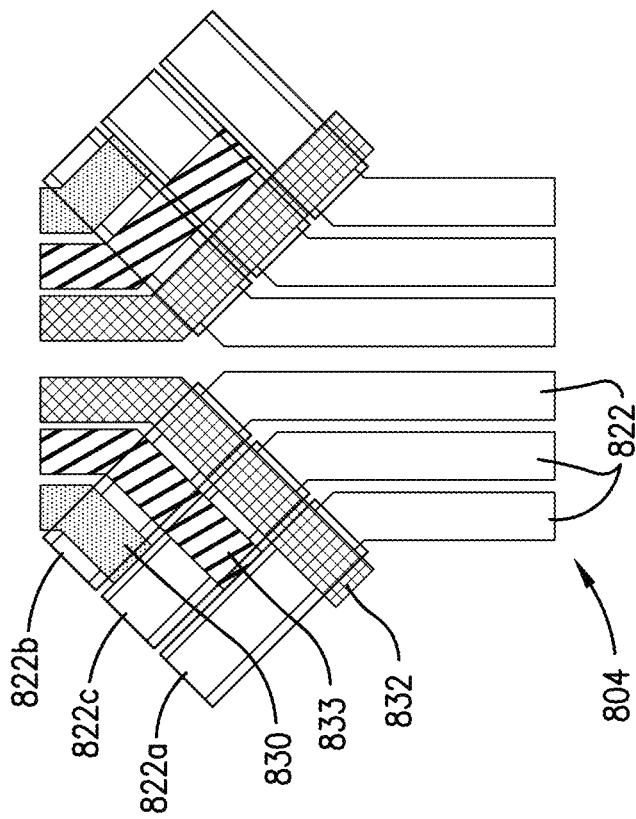

In FIG. 17C, the first fuel manifold 830 is in fluid communication with only the radially inner subset 822b of air/fuel mixing tubes 822, the second fuel manifold 832 is in fluid communication with each of the radially inner, radially outer, and radially intermediate subsets 822a-c of air/fuel mixing tubes 822, and the third fuel manifold 833 is in fluid communication with only the radially inner and radially intermediate subsets 822b-c of air/fuel mixing tubes 822.

In FIG. 17D, the first fuel manifold 830 is in fluid communication with only the radially inner subset 822b of air/fuel mixing tubes 822, the second fuel manifold 832 is in fluid communication with only the radially inner and radially intermediate subsets 822b-c of air/fuel mixing tubes 822, and the third fuel manifold 833 is in fluid communication with each of the radially inner, radially outer, and radially intermediate subsets 822a-c of air/fuel mixing tubes 822.

Figure 18C:
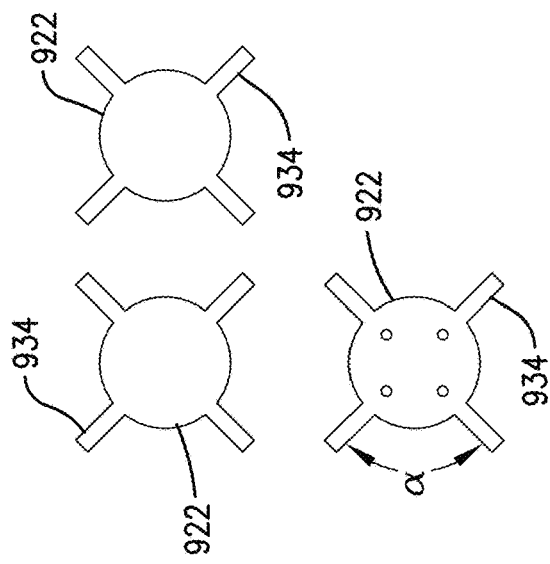
FIGS. 18A-C show schematic, cross-sectional views of various air/fuel mixing tubes according to aspects of the invention.
Figure 18B:
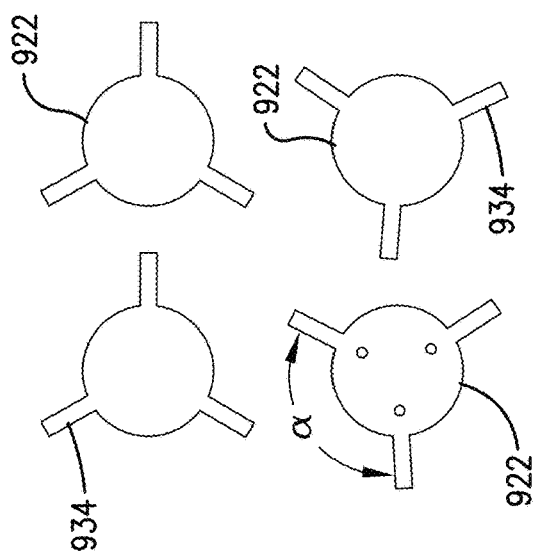
Figure 18A:
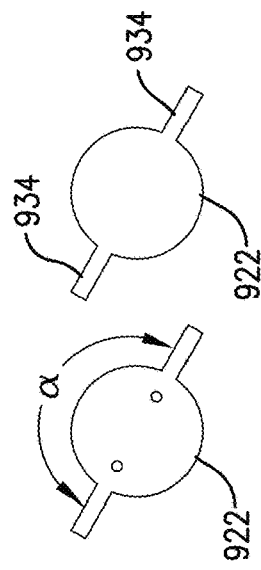

Although embodiments of the second injector discussed and shown herein include air/fuel mixing tubes that each include two fuel feed tubes in fluid communication with a respective fuel manifold, embodiments are not so limited. In other embodiments, each air/fuel mixing tube can include one fuel feed tube or else more than one fuel feed tube. For example, FIGS. 18A-C show schematic cross-sectional profiles of alternative embodiments of air/fuel mixing tubes 922 that include two, three, and four fuel feed tubes 934 at three different exemplary arrangements. As seen in FIGS. 18A-C, an angle, alpha, of the fuel feed tubes 934 can be varied to provide enhanced performance, mixing, and reduced emission benefits. For example, in some embodiments the angle alpha will be approximately 180-degrees, 120-degrees or 90-degrees, while in other embodiments the angle alpha could be another oblique angle without departing from the scope of the invention.

From the foregoing, it will be seen that this disclosure is one well adapted to attain all the ends and objects set forth above, together with other advantages which are obvious and inherent to the system and method. It will be understood that certain features and sub-combinations are of utility and may be employed without reference to other features and sub-combinations.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

In the specification and claims, reference will be made to several terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and the claim, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Range limitations may be combined and/or interchanged. Such ranges are identified and include all the sub-ranges contained therein unless context or language indicates otherwise.

As used herein, the terms "axial" and "axially" refer to directions and orientations extending substantially parallel to a center longitudinal axis of the combustor. The terms "radial" and "radially" refer to directions and orientations extending substantially perpendicular to the central axis. Moreover, directional references, such as, "top," "bottom," "front," "back," "side," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

The terms "coupled," "fixed," "attached to," and the like refer to both direct coupling, fixing, or attaching, as well as indirect coupling, fixing, or attaching through one or more intermediate components or features, unless otherwise specified herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

We claim:

1. An injector for a combustor of a gas turbine engine comprising:
   a plurality of air/fuel mixing tubes including a radially outer subset of air/fuel mixing tubes and a radially inner subset of air/fuel mixing tubes,
   wherein each air/fuel mixing tube of the radially outer subset of air/fuel mixing tubes includes a substantially quadrilateral cross-sectional profile, and
   wherein each air/fuel mixing tube of the radially inner subset of air/fuel mixing tubes includes a substantially circular cross-sectional profile;
   a first fuel manifold in fluid communication with the radially outer subset of air/fuel mixing tubes;
   a second fuel manifold in fluid communication with the radially inner subset of air/fuel mixing tubes; and
   a plurality of static air plenums, each static air plenum surrounding a corresponding one of the plurality of air/fuel mixing tubes such that each of the plurality of air/fuel mixing tubes is thermally isolated from a respective fuel manifold via a corresponding static air plenum, wherein each air/fuel mixing tube of the radially outer subset of air/fuel mixing tubes includes a blocker at an outlet of each air/fuel mixing tube of the radially outer subset of air/fuel mixing tubes, wherein four neighboring blockers are provided proximate one another to form a substantially circular flame anchoring surface.

2. The injector of claim 1, wherein each air/fuel mixing tube of the radially outer subset of air/fuel mixing tubes includes at least one flow modifier at an inlet of a respective air/fuel mixing tube to induce turbulence in compressed air passing through the respective air/fuel mixing tube upstream of a portion where fuel is injected into the respective air/fuel mixing tube.

3. The injector of claim 2, wherein the at least one flow modifier comprises a main wedge portion and a serrated end portion.

4. The injector of claim 1, further comprising a plurality of substantially L-shaped fuel feed tubes, each of the plurality of substantially L-shaped fuel feed tubes providing fluid communication between a downstream edge of one of the first manifold or the second manifold and one of the plurality of air/fuel mixing tubes.

5. The injector of claim 4, wherein each air/fuel mixing tube of the plurality of air/fuel mixing tubes is in fluid communication with the one of the first fuel manifold or the second fuel manifold via at least two of the substantially L-shaped fuel feed tubes.

6. The injector of claim 1, further including a plurality of substantially L-shaped fuel feed tubes, wherein each of the plurality of air/fuel mixing tubes comprises an upstream portion, a downstream portion, and an elbow portion that connects the upstream portion to the downstream portion at an oblique angle, each of the plurality of substantially L-shaped fuel feed tubes provides fluid communication between a downstream edge of one of the first manifold or the second manifold and one of the plurality of air/fuel mixing tubes, and each of the plurality of substantially L-shaped fuel feed tubes does not extend through any of the plurality of the static air plenums.

7. The injector of claim 6, wherein the oblique angle is a 45-degree angle.

8. The injector of claim 6, wherein the downstream portion of at least some of the plurality of air/fuel mixing tubes includes a swirled profile defining a substantially helical air/fuel flow path.

9. The injector of claim 1, including a series of spaced-apart ribs positioned at an inlet of each of the plurality of static air plenums and connecting each of the plurality of air/fuel mixing tubes with a body of the injector surrounding each of the plurality of static air plenum.

10. The injector of claim 1, including internal baffle plates positioned within the first fuel manifold and the second fuel manifold and having a plurality of through-holes for fluid flow through the internal baffle plates.

11. The injector of claim 10, wherein the plurality of through-holes is arranged in each of the baffle plates in three circumferential rows.

12. The injector of claim 1, wherein the first fuel manifold and the second fuel manifold are annular in configuration and nested together with the second fuel manifold positioned radially inwardly from the first fuel manifold.

13. An injector for a combustor of a gas turbine engine comprising:

a plurality of air/fuel mixing tubes including a radially outer subset of air/fuel mixing tubes and a radially inner subset of air/fuel mixing tubes, wherein each air/fuel mixing tube of the radially outer subset of air/fuel mixing tubes includes a substantially quadrilateral cross-sectional profile, and wherein each air/fuel mixing tube of the radially inner subset of air/fuel mixing tubes includes a substantially circular cross-sectional profile;

a first fuel manifold in fluid communication with the radially outer subset of air/fuel mixing tubes;

a second fuel manifold in fluid communication with the radially inner subset of air/fuel mixing tubes; and a third fuel manifold and a radially intermediate subset of the air/fuel mixing tubes, wherein the first fuel manifold is in fluid communication with each of the radially outer, radially intermediate, and radially inner subsets of air/fuel mixing tubes, the second fuel manifold is in fluid communication with only the radially inner subset of air/fuel mixing tubes, and the third fuel manifold is in fluid communication with only the radially inner and the radially intermediate subsets of air/fuel mixing tubes.

14. A combustor for a gas turbine engine and comprising:

a generally cylindrical flow sleeve;

a generally cylindrical combustion liner positioned radially inward from the generally cylindrical flow sleeve and defining a combustion zone;

a first injector that is generally annularly shaped and surrounds the generally cylindrical combustion liner and is positioned at a downstream end of the generally cylindrical flow sleeve, the first injector comprising:
radially outward openings to allow passage of compressed air following a radially outward path;
radially inward openings to allow passage of the compressed air following a radially inward path; and a second injector that is positioned radially inward of the generally cylindrical combustion liner at an inlet end of the combustion zone to receive the compressed air from the radially outward openings in the first injector following the radially outward path, the second injector comprising:

a plurality of air/fuel mixing tubes including a radially outer subset of air/fuel mixing tubes and a radially inner subset of air/fuel mixing tubes;

wherein each air/fuel mixing tube of the radially outer subset of air/fuel mixing tubes includes a substantially quadrilateral cross-sectional profile, and wherein each air/fuel mixing tube of the radially inner subset of air/fuel mixing tubes includes a substantially circular cross-sectional profile;

a first fuel manifold in fluid communication with the radially outer subset of air/fuel mixing tubes;

a second fuel manifold in fluid communication with the radially inner subset of air/fuel mixing tubes; and a plurality of static air plenums, each static air plenum surrounding a corresponding one of the plurality of air/fuel mixing tubes such that each of the plurality of air/fuel mixing tubes is thermally isolated from one of the first or second fuel manifold via a corresponding static air plenum, wherein each of the air/fuel mixing tube of the radially outer subset of air/fuel mixing tubes includes a blocker at an outlet of each air/fuel mixing tube of the radially outer subset of air/fuel mixing tubes, wherein four neighboring blockers are provided proximate one another to form a substantially circular flame anchoring surface.

15. The combustor of claim 14, further comprising a plurality of substantially L-shaped fuel feed tubes, each of the plurality of substantially L-shaped fuel feed tubes providing fluid communication between a downstream edge of one of the first manifold or the second manifold and one of the plurality of air/fuel mixing tubes.

16. The combustor of claim 15, wherein each air/fuel mixing tube of the plurality of air/fuel mixing tubes is in fluid communication with the one of the first fuel manifold or the second fuel manifold via at least two of the substantially L-shaped fuel feed tubes.

17. The combustor of claim 14, including a plurality of substantially L- shaped fuel feed tubes, wherein each of the plurality of air/fuel mixing tubes comprises an upstream portion, a downstream portion, and an elbow portion that connects the upstream portion to the downstream portion at an oblique angle, each of the plurality of substantially L-shaped fuel feed tubes provides fluid communication between a downstream edge of one of the first manifold or the second manifold and one of the plurality of air/fuel mixing tubes, and each of the plurality of substantially L-shaped fuel feed tubes does not extend through any of the plurality of the static air plenums.

* * * * *